United States Patent [19]

Culler

[11] 3,771,141

[45] Nov. 6, 1973

[54] DATA PROCESSOR WITH PARALLEL OPERATIONS PER INSTRUCTION

[75] Inventor: Glen J. Culler, Santa Barbara, Calif.

[73] Assignee: Culler-Harrison, Inc., Goleta, Calif.

[22] Filed: Nov. 8, 1971

[21] Appl. No.: 196,310

[52] U.S. Cl. .......... 340/172.5
[51] Int. Cl. .......... G06f 9/16
[58] Field of Search .......... 340/172.5

[56] References Cited

UNITED STATES PATENTS

| | | | |
|---|---|---|---|
| 3,234,523 | 2/1966 | Blixt | 340/172.5 |
| 3,346,851 | 10/1967 | Thornton | 340/172.5 |
| 3,364,472 | 1/1968 | Sloper | 340/172.5 |
| 3,537,074 | 10/1970 | Stokes | 340/172.5 |
| 3,544,973 | 12/1970 | Borck | 340/172.5 |

*Primary Examiner*—Paul J. Henon
*Assistant Examiner*—Vandenburg John P.
*Attorney*—Lindenberg, Freilich & Wasserman

[57] ABSTRACT

An electronic digital data processor particularly useful for performing tasks requiring substantial list processing computation in real (or neat real) time. The processor is organized in a manner which permits multiple operations, including arithmetic and data transfer operations, to be executed in parallel at each clock time in response to a single instruction drawn from an instruction memory. This parallel operation is achieved as a consequence of implementing the internal data registers and arithmetic circuits with multiple data inputs and by controlling them in response to a particular instruction format. Data is held constantly variable at each register input bit position. The particular data input selected at any clock time for transfer into a register is determined by the particular instruction concurrently contained within an instruction buffer register. Instructions are drawn one at a time into the instruction buffer from a high speed internal instruction memory which in turn is normally loaded, one instruction block at a time, from a core memory. The instruction format includes multiple fields which separately identify operations to be executed in parallel.

10 Claims, 8 Drawing Figures

MAIN BLOCK DIAGRAM

MAIN BLOCK DIAGRAM

ARITHMETIC UNIT

OP CODE 1, MODE 0&1

OP CODE G, MODE 0&1

DATA PROCESSOR WITH PARALLEL OPERATIONS PER INSTRUCTION

BACKGROUND OF THE INVENTION

This invention relates generally to digital data processing equipment and more particularly to an improved processor organization particularly suited to performing tasks requiring a substantial amount of computation in real or near real time on a long list of data or long signals.

An increasing number of data processing applications are arising which require that a relatively substantial amount of computation be performed in real or near real time. For example only, many scientific applications may require the execution of complex tasks involving convolution, Fouriere Analysis, spectral decomposition, special function generation (e.g. Gaussian wave functions), etc. Although the prior art is replete with various data processors, as a general rule most such processors are usually either too slow for these applications or encompass enormous amounts of hardware inordinate to the application. Some special purpose processors have been developed which are well suited to a praticular class of real time processing problems but these are generally of very limited use for other classes of problems.

SUMMARY OF THE INVENTION

An object of the present invention is to provide a general purpose data processor which is capable of executing complex computational tasks very rapidly so as to be useful as a real time processor, for a variety of applications.

Briefly, a data processor is provided in accordance with the present invention, organized so as to permit a multiplicity of tasks defined by a single instruction to be initiated simultaneously and executed in parallel. More particularly, instructions are drawn, one at a time, from a very fast internal instruction memory into an instruction buffer. Each such instruction defines up to four operations including both arithmetic, logic and transfer operations, to be executed in parallel. Parallel execution of up to four operations is achieved as a consequence, in part, of implementing each of the processor data registers with four separate multi-bit data input ports. Output data from fixed sources is constantly held available at each data input port, with a particular port being selected by the instruction then contained within the instruction buffer for transferring data therethrough into the data register.

In accordance with a significant aspect of the invention, instructions are loaded into the instruction memory in blocks, as for example, from a core memory. Such a block would represent a substantial process of operations to be applied to incoming data and has the effect of specializing the processor to behave as a very fast special purpose computer. However, since the instruction memory is loaded under program control, the processor retains the characteristics of a general purpose computer, or perhaps more accurately, a selectable family of special purpose computers.

The preferred embodiment of the invention is comprised of four major units;

1. control unit,
2. arithmetic unit,
3. core memory, and
4. I/O interface.

The control unit includes elements for controlling system timing as well as for defining and controlling operations to be executed. Briefly, the control unit is organized around a high speed semiconductor instruction pad memory. Blocks of instructions are transferred from the large capacity core memory to the instruction pad memory. Instructions are read out of the instruction pad memory, one at a time, into an instruction buffer. The instruction, defining up to four operations to be executed in parallel, is decoded and control signals are then routed to the appropriate system elements, such as in the arithmetic unit. The arithmetic unit includes a semiconductor data pad memory, a plurality of registers, an adder unit, and a multiplier unit. Each register is provided with input gating which effectively enables any one of four data input ports to be selected by the control signals for inputting data to the register. Data is constantly held available at each selectable input port.

The ability to initiate and execute operations in parallel, as disclosed herein, enables highly complex computational tasks to be very rapidly performed with a minimum of hardware thereby making embodiments of the invention particularly well suited for many real time processing applications.

The novel features that are considered characteristic of this invention are set forth with particularity in the appended claims. The invention will be best understood from the following description when read in conjunction with the accompanying drawings.

DESCRIPTION OF THE PREFERRED EMBODIMENT

Introduction

Figure 1:
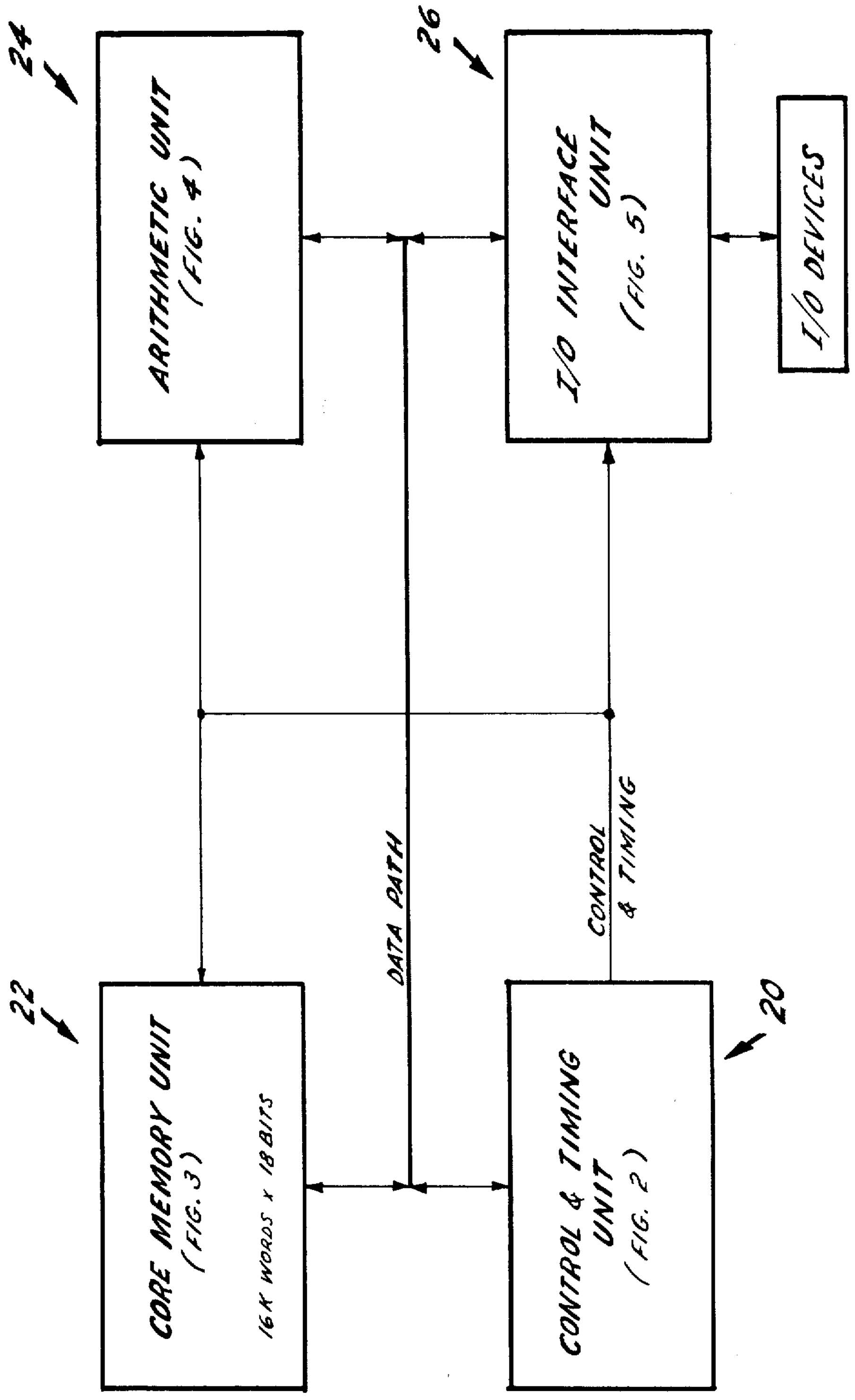
FIG. 1 is a block diagram of a data processor in accordance with the present invention.

Prior to considering the processor organization in detail, its overall functional and structural characteristics will be briefly discussed. The subject processor is an extremely fast parallel processor specifically designed to facilitate tasks such as experimental data analysis (filter, smoothing, editing, reduction) signal processing and conditioning, convolution, Fourier Analysis, spectral decomposition, control of multiple graphic display terminals, and similar tasks which require substantial computation, in real or near real time. A relatively short basic data word length of 16 bits is assumed herein. This length was selected primarily in recognition of the inherently analog nature of the tasks which the processor is intended to perform.

The subject processor is characterized by its facility to simultaneously perform both computation and data manipulation and thus yield high computational power and speed. Its operational characteristics are attributable primarily to an organization which minimizes the size and complexity of the control portion while maintaining a high degree of flexibility in routing data within the processor. The high degree of flexibility is intrinsic in the instruction format which permits each instruction to specify up to four distinct operations to be initiated and executed in parallel. This format yields a degree of parallism and microprogram ability not heretofore available.

The subject processor is assumed to have a cycle time of 125 ns which is realized with a semiconductor nondestructive read out instruction pad memory. An instruction drawn from the instruction pad memory into an instruction buffer identifies up to four operations which can be executed in parallel during one cycle time. The allowable parallelism is achieved in part, by providing each register with four multibit data input ports at which different information is held constantly available for entry into each bit location of a register. The processor contains a semiconductor data pad memory, buffer registers, and special modules for performing the fundamental arithmetic and logical operations. The data pad memory is tightly coupled to the arithmetic unit and serves as an effective buffer between the high speed arithmetic unit and a large capacity random access core memory. As an indication of the effective speed, a complete multiplication of two signed eight bit words can be accomplished in three cycles or 375 ns. Furthermore, up to nine additional operations, such as 16 bit adds, register transfers, shifts, flag checks etc., can be performed in parallel during this same time interval.

Highly effective performance is achieved by properly employing the programability of the internal instruction pad memory to operate in a macro or loop mode. In such a mode, the instruction pad memory is loaded from core memory with a block of instructions which represent a substantial process of operations to be applied to incoming data. (This data may be arriving from a peripheral device or may be drawn from a data list in core). The designated sequence of operations is executed within the processor without requiring core memory access thus making maximum use of its fast cycle time and parallel logic while eliminating the delay associated with core memory accesses.

SYSTEM ORGANIZATION

Attention is now called to FIG. 1 which illustrates in block form the major units of a processor constructed in accordance with the present invention. Briefly, the processor can be considered as being comprised of a control and timing unit, 20, a core memory unit 22, an arithmetic unit 24, and an I/O interface unit 26. The units 20, 22, 24, and 26 are illustrated in greater detail in FIGS. 2, 3, 4, and 5 respectively. As will be seen hereinafter, the control and timing unit 20 includes a high speed semiconductor instruction memory which is loaded with a block of instructions (referred to as a Macro) from the core memory unit 22. Instructions are read out one at a time from an instruction pad memory within the controlling and timing unit 20 into an instruction buffer also within the unit 20 and, as a consequence, an exacting set of control and timing signals, unique to each instruction, is generated which determine interconnecting paths for the data transfer within and between the four major units and the logical and arithmetic operations to be performed. Each instruction is then decoded within one machine cycle (125 n sec) and may produce a plurality of simultaneous register transfers and arithmetic operations. It is pointed out that although all instruction sequences are executed from the instruction memory, certain instructions provide direct access to the core memory to thereby permit the execution of longer instruction sequences than could be executed from the instruction memory alone.

In accordance with a preferred embodiment of the invention, each instruction is comprised of 28 bits grouped into fields as shown below in Table I:

TABLE I

| 13 12 11 10 | 7 6 | 5 4 3 2 1 0 | 17 16 15 14 | 13 12 11 | 10 7 6 | 5 4 3 | 2 1 0 |
|---|---|---|---|---|---|---|---|
| T FIELD | MODE | J FIELD | OP CODE | D FIELD | C FIELD | B FIELD | A FIELD |

The data contained within each of the fields illustrated in Table I has the following meanings:

FIELD DEFINITIONS

T-FIELD = REPEAT NUMBER, this value is decremented at each clock-time (125 ns) during execution until it is zero. In general, the instruction is performed one more time than shown in the repeat number.

MODE = INSTRUCTION MODE, this specifies the overall meaning of the fields OP-CODE, D-FIELD, C-FIELD, B-FIELD, A-FIELD.

J-FIELD = INSTRUCTION ADDRESS of normal successor instruction.

OP-CODE = OPERATION TYPE, after the instruction MODE has been selected, the set of operations that can be performed in parallel is determined by the type of operation or OP-CODE.

D,C,B,A = PARALLEL OPERATIONS, each of these three-bit fields permit the selection of one out of eight possible operations as defined by MODE and OP-CODE.

From the foregoing, it will be recognized that the data contained within each of the three bit operation fields, i.e. A, B, C, and D, identifies one of eight possible operations to be performed as further defined by the data contained within the MODE and OP-CODE fields. The wealth of operations that can be performed in parallel by the subject processor is attributable in large part to the manner in which the various registers within the major units of FIG. 1 are implemented. All of the registers will be specifically considered in connection with the more detailed description of each of the major units of FIG. 1. At this point, however, it would be well to appreciate that typically, each register in the processor contains four data input ports. Data is continually held available at each of the four ports and a particular port is selected for data entry by a control signal generated by the control unit 20 in response to an active instruction word drawn from an instruction pad memory in the unit 20 into an instruction buffer also within the unit 20. More particularly, a typical register contains eighteen bit positions consisting of two flag bit positions and sixteen data bit positions. The data input path to each of the eighteen bit positions in each register is established by selected closure of the gating circuitry coupled to one of the four data input ports. For example, if the port 1 gating of a particular register is closed, then the data available at port 1 of all 18 bit positions of that register will be read into the register.

The output lines from any particular register are not gated but are coupled to one of the data input ports of all of the other registers to which it may be desired to transfer data from that particular register. Thus, it should be understood that no register ever really "sends" data to another register. Rather data is at all times available at each of four input ports of a register and at a clock cycle time, the gating associated with a particular data input port will be closed in order to load the data available at that port into the register. Thus, in accordance with the preferred embodiment of the present invention, data can be simultaneously read into several registers in contrast to most prior art systems in which data is normally read into only one register at a time from a memory bus.

Reference will now be made to FIGS. 2, 3, 4, 5 which respectively illustrate in block form, the organization of the control and timing unit 20, the core memory unit 22, the arithmetic unit 24, and the I/O interface unit 26. The elements and internal organization of each of these major units will be considered individually but no attempt will be made to exhaustively disclose the hardware details since such information is well known in the art and not particularly germane to the teachings of the present invention. The organization and functioning of each of the major units will be discussed primarily as they relate to an understanding of the parallel operations tables to be discussed hereinafter. It is pointed out that the unusual effectiveness of the disclosed processor is primarily attributable to the instruction format and operation sets illustrated in tabular form in the parallel operations tables.

CONTROL AND TIMING UNIT 20

Initially considering the control and timing unit 20, it is pointed out that this unit is organized around a high speed 64 word × 28 bit semiconductor instruction memory. The instruction pad memory is utilized to store blocks of instructions which are loaded into the instruction pad memory by a set of input lines 42. More particularly, blocks of instructions, i.e. Macros, loaded into the control pad 40 are normally drawn from the large capacity core memory unit 22 through registers 11 and 12 of the arithmetic unit 24 to be discussed hereinafter. As will be seen hereinafter, instructions executed from the instruction pad memory can provide access to the large core memory 22 to thereby enable long and complex sequences to be executed while still permitting very rapid processing of instruction sequences which can be fully contained within the instruction memory. In response to certain instructions (i.e. link jump) the instruction pad 40 can be loaded via multiplexer 43 which functions to derive some bits from register 12 and others from the instruction buffer 44. Instructions are read out, one at a time, from the instruction pad 40 on output lines 46 from locations defined by the contents of an instruction pad address register 48. As will be recalled from Table I, each instruction is comprised of 28 bits grouped into eight fields. The J field information which identifies the address of the next instruction to be read from the instruction pad is normally routed from the output lines 46 to the instruction pad address register 48. The OP CODE, D, C, B, and A field information is normally routed to instruction buffer 44 where it is held during the instruction execution time. The two bit mode field is routed to a pair of mode flip-flops 50. The instruction buffer contents is decoded by decoding circuitry 54 which in turn develops control signals which are routed to the appropriate elements of the major processor units. Although instructions are normally loaded into the instruction buffer 44 from the instruction pad 40, single instructions can also be loaded into the instruction buffer 44 from the core memory via a path which encompasses register 11 in the arithmetic unit 24.

Figure 2:
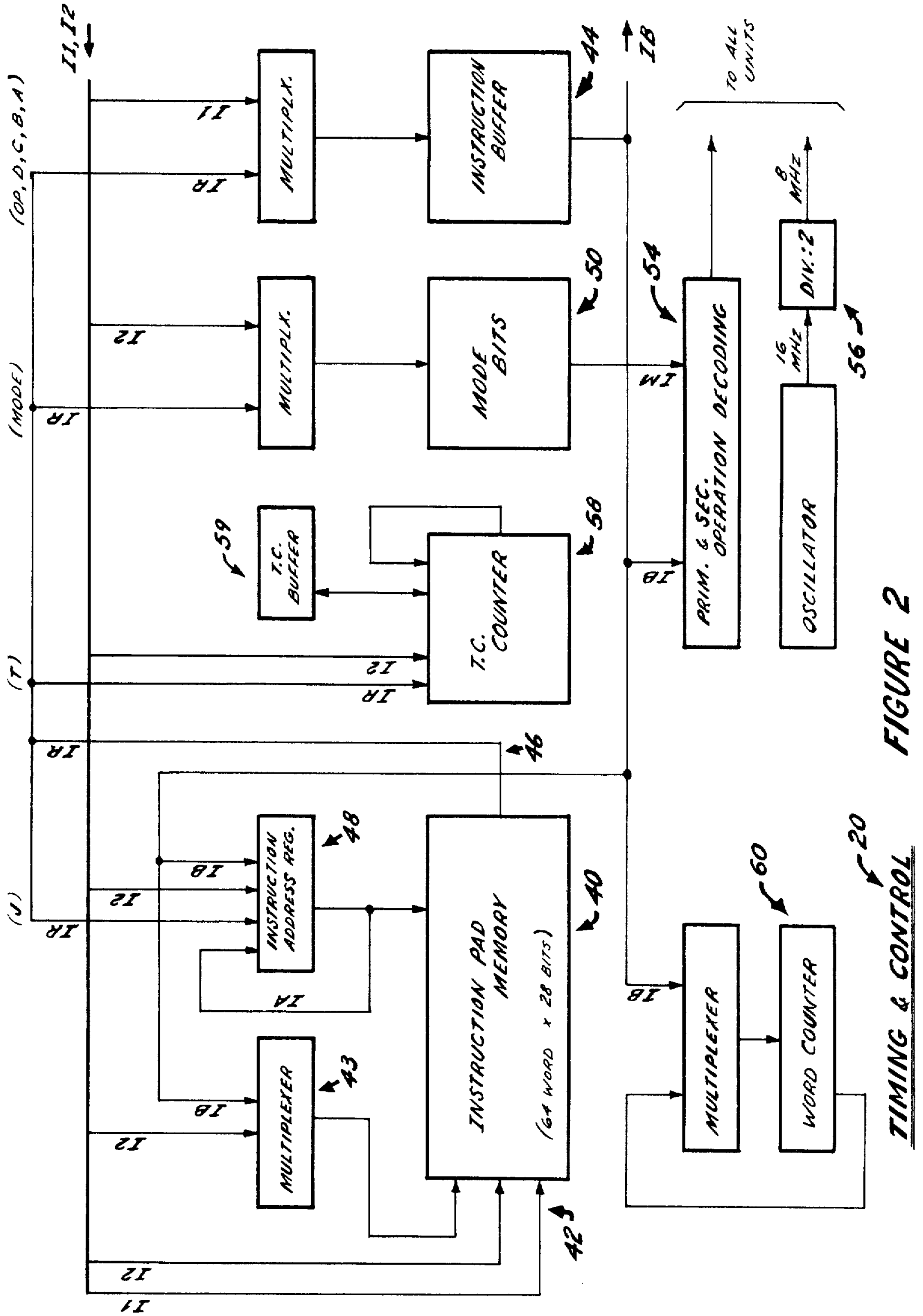
FIG. 2 is a block diagram of the control and timing unit of FIG. 1.

In addition to developing control signals, the unit 20 of FIG. 2 develops timing pulses in response to 8 MHz clock pulses provided by clock generator 56, defining a 125 n sec. cycle time. A four bit timing counter 58 and an eight bit word counter 60 are provided for developing timing signals for instructions which require execution times in excess of one cycle time, i.e. 125 ns.

More particularly, the four bit timing counter 58 is loaded with the T field information of an instruction read from the instruction pad which indicates how many times the instruction is to be executed. In the execution of most instructions, when the next instruction is accessed from the instruction pad and the J field thereof is loaded into the instruction pad address register 48, the T field thereof is concurrently loaded into the timing counter 58. It is thereafter decremented at each clock time until it reaches zero. This permits the instruction execution time to be extended to enable an instruction to be executed over more than one cycle and also enables the same instruction to be executed a multiple number of times. In the execution of certain instructions e.g. an instruction (OP CODE 14) to load the instruction pad from core memory, the timing counter 58 is not decremented at the first clock time after being loaded but its contents is stored in a timing counter buffer register 59. At the same time, the number of words (as specified by A and B fields) to be loaded into the instruction pad is entered into a word counter 60. The timing counter is thereafter decremented at each clock time. When the timing counter reaches zero, if the word counter has not yet reached zero, the original value in the timing counter 58 is reloaded therein from the timing counter buffer register 59 and the word counter is decremented. The process of counting down the timing counter 58 continues until the word counter reaches zero at which time a new instruction is loaded into the instruction buffer 44 and a new T field is loaded into the timing counter 58.

As has just been mentioned, the function of the word counter 60 is to count the number of words to be loaded into the instruction pad when executing a load instruction (i.e. OP CODE 14) which will be discussed in greater detail hereinafter.

As a basis for understanding the parallel operations tables to be discussed hereinafter, the following control unit 20 registers and line sets listed by name and typical usage, are of particular importance:

TABLE II

| | Name | Bits | Usage |
|---|---|---|---|
| Control Unit 20 | $E_2$ | 8 | Extention of $E_1$ |
| | $E_3$ | 4 | Extension of $E_1$ $E_2$ |
| | IR | 28 | Instruction Pad 40 Output Lines |
| | IB | 16 | Instruction Buffer 44 |
| | IA | 6 | Instruction Pad Address Register 48 |
| | TC | 4 | Timing Counter 58 |
| | IM | 2 | Mode flip-flops 50 |

CORE MEMORY UNIT 22

Figure 3:
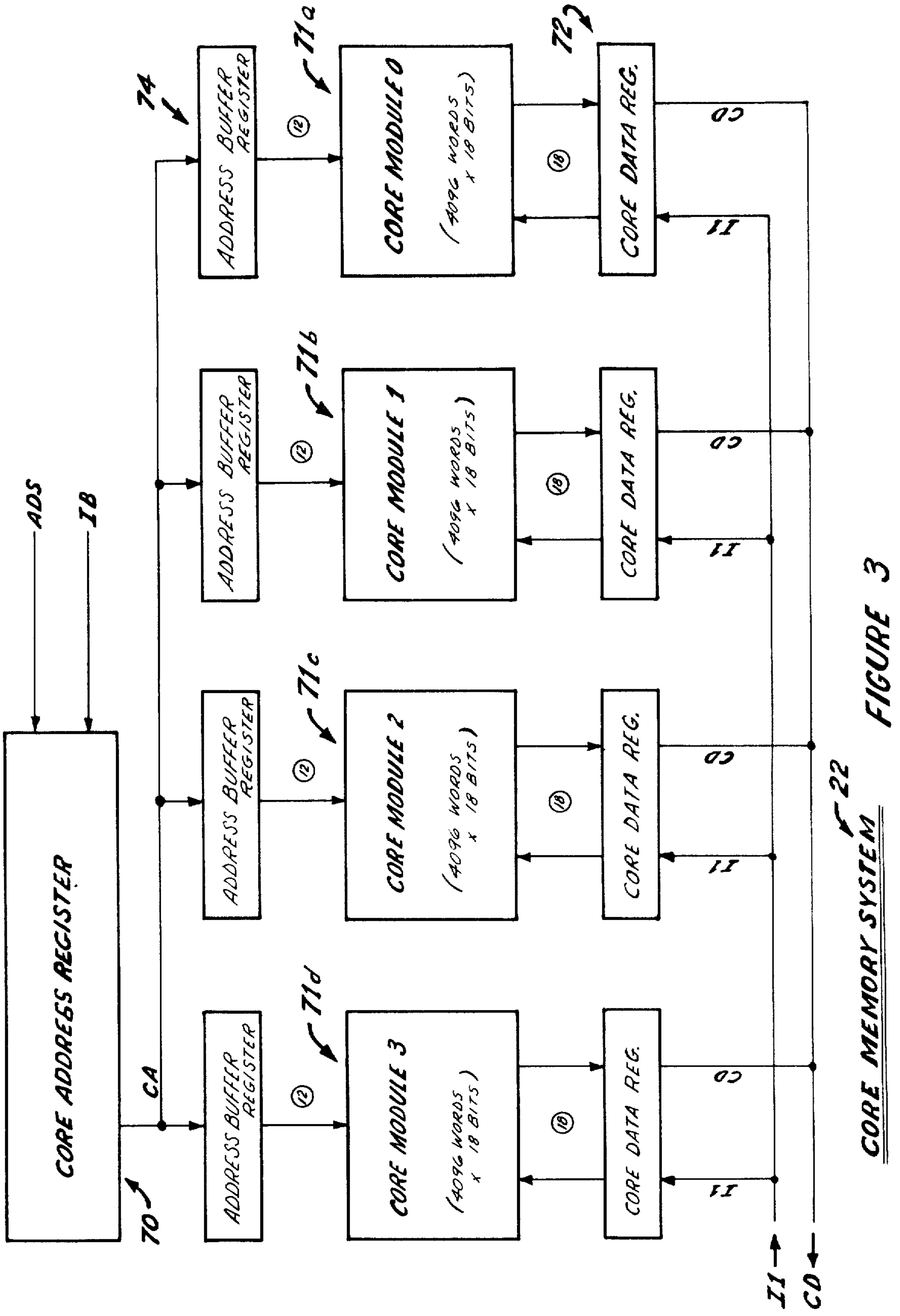
FIG. 3 is a block diagram of the core memory unit of FIG. 1.

Attention is now called to FIG. 3 which illustrates the core memory unit 22 in greater detail than is shown in FIG. 1. The core memory unit consists of a 16 bit memory address register 70 and four self-contained 4K × 18 bit core modules 71*a*, 71*b*, 71*c*, 71*d*. The core address register 70 is loaded from the adder sum output lines (ADS) from the arithmetic unit 24 or from the instruction buffer (IB) 44 of the control and timing unit 20. Each core module includes a core data register 72. The output lines (CD) from all the registers 72 are coupled to an I1 register and data pad input bus in the arithmetic unit 24 to be discussed hereinafter. The input lines to the registers 72 are derived from the arithmetic unit register I1 for transferring data into the memory. The word location in each module for reading and writing is defined by address information entering into buffer address registers 74 from the output lines (CAR) of the core address register 70.

In the operation of the core memory unit, a fourteen bit address entered into the address register 70 is required to select a unique word in the 16K word core. Bits 14 and 15 are decoded to generate a module select signal which functions to select one of the four core modules. The module select signals is gated with a timing signal (not shown), generated within the control and timing unit 20, to derive a core initiate signal which initiates the following actions:

1. starts the timing chain within the selected core module; and
2. causes bits 0 through 13 of the core address register 70 to be transferred to the address buffer register 74 of the selected module. The module select signal is used within the selected module to derive a control term which gates the contents of the internal core data register 72 onto the core output data lines (CD).

The core unit registers and lines significant to an understanding of the operations tables set forth hereinafter are as follows:

TABLE III

| Core Unit 22 | Name | Bits | Usage |
|---|---|---|---|
| | CAR | 16 | Core Address Register |
| | CD | 18 | Core Data Register Read Out |

ARITHMETIC UNIT 24

Figure 4:
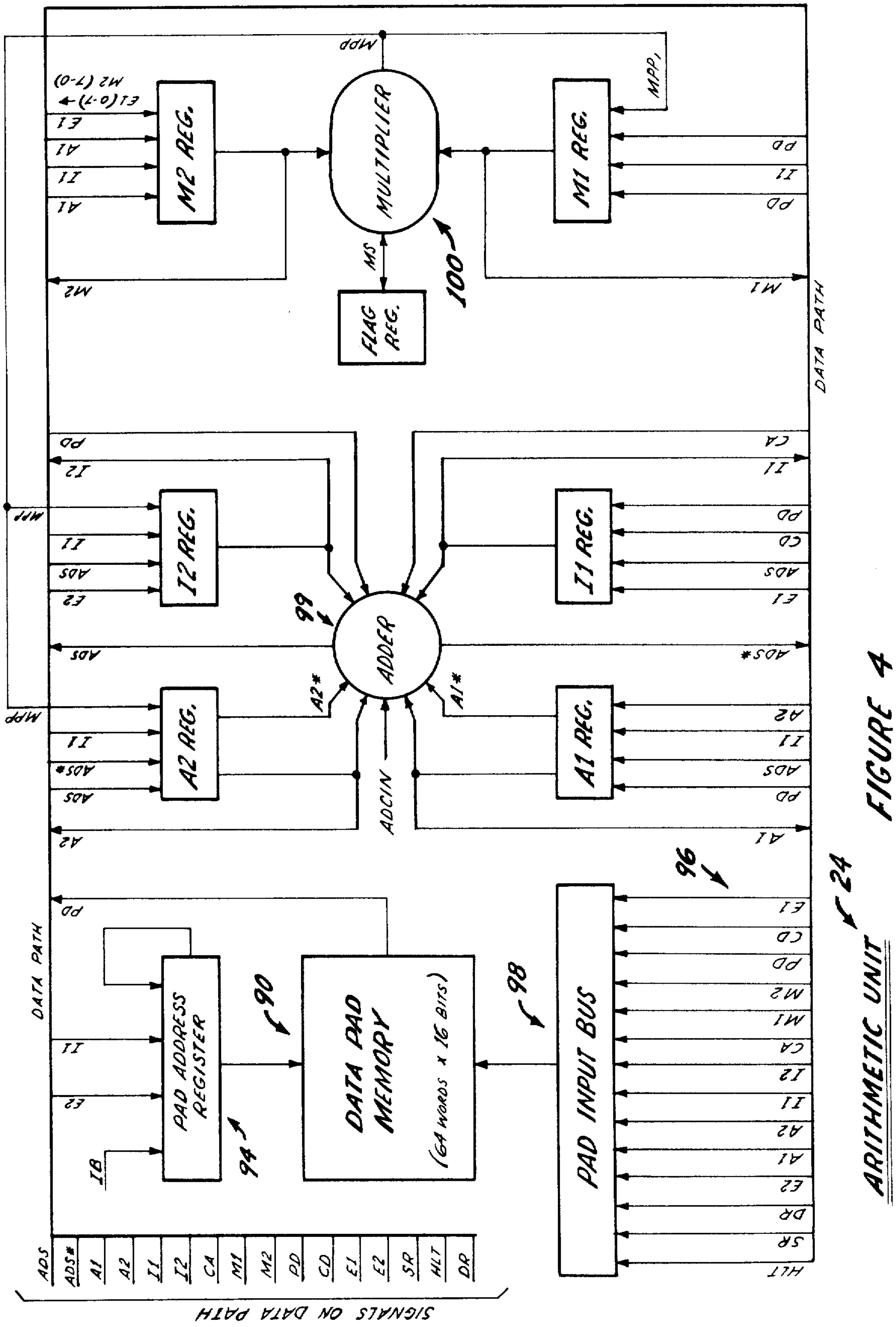
FIG. 4 is a block diagram of the arithmetic unit of FIG. 1.

Attention is now called to FIG. 4 which illustrates the principal elements of the arithmetic unit 24. The arithmetic unit is comprised of a semiconductor memory or data pad 90 comprised of 64× 16 bit locations. Information is read out of the pad 90 onto output lines (PD) from locations defined by the content of a pad address register 94. Information is written into the pad 90 through input lines 96 via a pad input bus 98. In addition to the pad address register 94, the arithmetic unit includes six other principal registers respectively identified as A1, I1, A2, I2, M1, M2. Each of these six registers has four selectable data input ports as has been previously mentioned. Information is constantly held available at each of the data input ports and a selected port is closed in response to control signals (not represented in FIG. 4) developed by the instruction decoding circuitry 54 of the control and timing unit 20.

The arithmetic unit 24 further includes a sixteen bit adder circuit 99 and an eight bit multiplier circuit 100. The register M1 and M2 respectively hold the eight bit multiplier and multiplicand when multiplying eight bit numbers. Longer numbers can be multiplied by distributive algorithms, as is known in the art. The multiplier and multiplicand are stored in registers M1 and M2 in sign magnitude form. Typically, numbers are represented in the system in two's complement form. The adder module accepts input directly from six registers and is capable of forming the: sum, difference, increment, decrement, and, or, exclusive or, and two's complement of 16-bit numbers. The adder output ADS or adder complement ADS* may be gated to several registers. A complete add operation requires one cycle-time of 125 n sec, however, as many as three other operations may be occurring in parallel. Carry and overflow detection are automatic following each adder operation.

The following registers and lines of the arithmetic unit are significant to an understanding of the parallel operations tables to be discussed hereinafter.

TABLE IV

| General Function | Name | Bits | Usage |
|---|---|---|---|
| Arithmetic Unit 24 | $A_1$ | 16 | Coupled to PAD |
| | $A_2$ | 16 | Coupled to multiply operation and core address register |
| | $I_1$ | 18 | Coupled to core |
| | $I_2$ | 16 | Coupled to multiply operation and core address register |
| | $M_1$ | 8 | Multiply, first register |
| | $M_2$ | 8 | Multiply, second register |
| | FL | 8 | Flag register left, collection of all left flags |
| | FR | 8 | Flag register right, collection of all right flags |
| | PA | 6 | Pad Address Register |
| | OF/CF | 2 | Overflow and carry flags (to AD) |
| | ADS | 16 | Adder output |
| | ADS* | 16 | Adder complement output |
| | PDI | 16 | Data Pad Input |
| | MPP | 16 | Multiply Output |
| | MS | 1 | Multiply Output Sign |

All of the registers and lines indicated in the foregoing list have been previously mentioned except for flag registers FL and FR and overflow and carry flip-flops OF and CF.

Flag register FL consists of eight bit stages, each associated with a different one of registers S, D, M1, M2, I1, I2, A1, A2. Similarly, flag register FR consists of eight bit stages, each associated with one of the registers S, D, M1, M2, I1, I2, A1, A2. The flag registers are used primarily to store sign bits, as will be seen hereinafter, each of the flag register bits can be individually examined in response to a "bit test" instruction (OP CODE 15) to determine whether a jump address operation should be executed.

I/O INTERFACE UNIT 26

Figure 5:
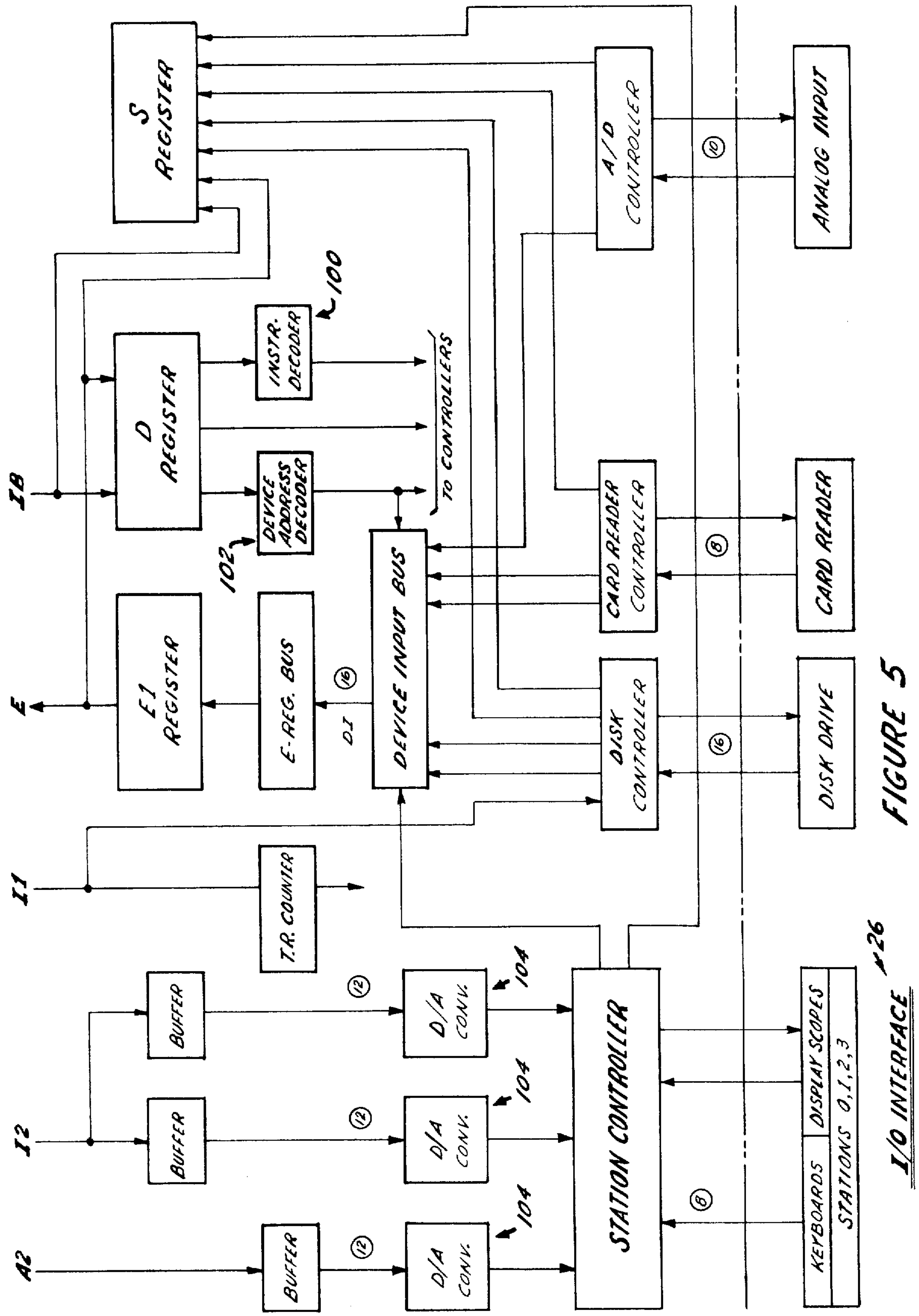
FIG. 5 is a block diagram of the I/O interface unit of FIG. 1.

Attention is now called to FIG. 5 which illustrates the organization of an exemplary I/O interface unit 26. It will be appreciated that the particular mix of peripheral devices employed is not at all critical to the present invention but is illustrated only as constituting a representative example. For present purposes, it is only necessary to consider those elements within the I/O interface unit which interface directly with the major processor units previously mentioned. Thus, for example, particular attention is called to the E1, D and S registers. All input/output functions take place only on command from the processor. Thus, instructions and peripheral device addresses are transferred from the instruction buffer 44 of the control unit 20 to the D register of the I/O interface unit 26. The instruction is then decoded by decoder 101 and routed to the appropriate peripheral device determined by decoder 102 decoded the device address. Output data is transferred on command from the Arithmetic unit registers e.g. I2, A2, to the appropriate I/O device e.g. a digital to analog converter 104 for use, for example, with a display storage tube. An input/output device can signal the processor by turning on a unique interrupt bit in the S register. Upon recognition of this interrupt, the processor can command the particular input/output device to output its status to the I/O bus from which it can be loaded into typical embodiment of the invention will be set forth. For convenience, the instructions are first grouped according to MODE; second (within a MODE) according to OP CODE; third (within an OP CODE) according to DCBA field definition; and last, the particular transformation resulting from a given numerical value within a field. For the sake of easy reference, these groupings are presented in tabular form.

Table VI, set forth hereinafter, identifies the meaning of the various fields of an instruction word of MODE 0. In interpreting Table VI, the significance of each D, C, B, and A field for a particular OP CODE can be determined. For example only, if a particular instruction word defining MODE 0 also defines an OP CODE 1, then the meanings of the D, C, B, and A fields are determined by sighting to the right across the table from OP CODE 1. As can be seen, the value represented by the three bit D field will define a particular operation identified in the ADDER OPERATIONS Table XV. The three bit C field value will identify the source of data to be transferred into the E register. The value of the three bit B field will identify the source of data to be transferred into the pad address register (PA) and similarly the value of the three bit A field will identify the source of data to be transferred into the I2 register.

TABLE VI

| | Mode 0 | | | | |
|---|---|---|---|---|---|
| | OP Code | D Field | C Field | B Field | A Field |
| Instructions format table | 0 | | Special Parallel Instructions | | |
| | 1 | Adder Row | E1, E2 | PA | I2 |
| | 2 | (C Field=0 | E1, E2 | A2 | PD |
| | 3 | in Adder | M1 | M2 | A1 |
| | 4 | Operations | M1 | M2 | I2 |
| | 5 | Table) | E1, E2 | I1 | PD |
| | 6 | | | PA | PD |
| | 7 | | | PA | A1 |
| | 10 | | | A2 | A1 |
| | 11 | Adder Row | Adder Column | I1 | A1 |
| | 12 | | | A2 | I2 |
| | 13 | | | I1 | I2 |
| | 14 | Load type | | # Words-1 | |
| | 15 | Bit test | | Jump address | |
| | 16 | Logic type | | Specifier or jump address | |
| | 17 | Return address | | Not used | |

the E1 register. Data from an I/O device can also be loaded into register E1 in a similar fashion. The E1 register is rather tightly coupled to the arithmetic unit so that its content can be easily transferred to the Register I1.

The registers and lines of the I/O interface unit which are particularly significant to an understanding of the parallel operations tables to be discussed hereinafter are as follows:

TABLE V

| General Function | Register and lines | No. of Bits | Main Use |
|---|---|---|---|
| Input/ Output Unit 26 | TR | 16 | Real Time Counter (1μ sec increments) |
| | E1 | 16 | Coupled to External I/O units and pads |
| | D | 8 | Device communications register |
| | S | 8 | Interrupt Status Register |
| | DI | 16 | Device input lines |

PARALLEL OPERATIONS TABLES

The instruction format will be recalled from Table I. Hereinafter, the variety of operations and combination of operations available within the instruction set of a As an example of the variety of instructions possible, the functional operations which may be carried out in MODE 0 are described below:

*OP CODE 0: SPECIAL PARALLEL OPERATIONS

Allows loading of up to six selected registers in parallel. The registers are A1, A2, I1, I2, M1 and M2.

*OP CODES 1–5: NORMAL ADD

Allows the execution of one of seven adder-functions in parallel with the loading of three other REGISTERS. The registers are selected by the OP CODE used.

*OP CODES 6–13: FIXED-DESTINATION ADDS

Allows the execution of 63 different arithmetic and logic functions, including: add, subtract, negate, sign magnitude and two's complement conversion, increment, decrement, AND, OR, exclusive OR, tests for equality, greater or less than, and many others. Two other register-functions may be performed in parallel.

*OP CODE 14: LOAD

Allows the loading of all or part of instruction-pad or data-pad. The instruction-pad can be loaded from the core-memory or from the data-pad. The data-pad can be loaded from core-memory. The instruction also allows for storing all or part of data-pad into the core-memory. Several additional special load operations are possible.

*OP CODE 15: REGISTER TESTS

Allows for testing of a specific bit in several registers.

*OP CODE 16: CONDITION TESTS

Allows for several different types of operations including testing for pad addresses, the comparing of bits in several registers, the setting and clearing of bits in some registers, etc.

*OP CODE 17: LINK-JUMP

Allows jumping to other programs in instruction-pad and returning to a selected place in instruction-pad. The meanings of these OP-CODE groups then change for MODES, 1, 2 or 3. Furthermore, the specific events which can occur for a given MODE and OP-CODE are determined by the contents of the A, B, C, and D fields. As a single particular example, the following typical instruction will be decoded.

| T | M | J | OP | D | C | B | A |
|---|---|---|---|---|---|---|---|
| 0 | 0 | 5 | 4 | 6 | 3 | 4 | 4 |

T = 0, only one clock-time of 125- nsec will be needed.

M = 0, mode zero (see summary above).

J = 5, next instruction will be found in instruction address 5.

OP =4, determines a class of add and transfer possibilities.

D = 6, permits the contents of registers $A_2$ and $I_1$ to enter the adder and gates the sum back to $I_1$.

C = 3, enables bits 0–7 of $I_1$ to go to $M_1$ (one side of the multiplier) and the $I_1$ flag right is transferred to the $M_1$ flag right.

B = 4, enables bits 0–7 of $A_1$ to $M_2$ (a multiply input-register) and the $A_1$ flag right to the $M_2$ flag right.

A = 4, enables the current multiply product to $I_2$ (without the sign bit).

As a net result, the following functions all would take place in the single clock-time of 125-nsec.

1. $A_2 + I_1 \rightarrow I_1$
2. $I_1(0–7) \rightarrow M_1$; $(I_1F_1 \rightarrow M_1F_1)$
3. $A_1(0–7) \rightarrow M_2$; $(A_1F_1 \rightarrow M_2F_1)$
4. $MP(0–17) \rightarrow I_2$ It will be recalled that Table VI related to instructions defining MODE 0. Instructions defining MODE 1 instead of MODE 0 cause the same operation as was indicated in Table VI except for the following modifications indicated in Table VII:

TABLE VII

Mode 1

OP CODES 1, 2, . . . 13 transfer the ADDER output to CA.

OP CODE 14, with one exception, is the same as MODE 0. (See OP CODE 14 TABLE)

OP CODE 15 reverses the test consequences of MODE 0.

OP CODE 16 reverses the test consequences for several instructions (See OP CODE 16 TABLE).

OP CODE 17 is the same as MODE 0 except that the immediate successor is defined by the JUMP ADDRESS (BA)

Table VIII, set forth hereinafter, indicates the operations occurring in response to instructions defining MODE 2:

TABLE VIII

| MODE 2 | | | | |
|---|---|---|---|---|
| OP CODE | D FIELD | C FIELD | B FIELD | A FIELD |
| 1 | ADDER ROW | E | | |
| 2 | (C FIELD=0 | PD | | |
| 3 | in ADDER | PDI→E1 | | |
| 4 | OPERATIONS TABLE) | M1 | | |
| 6 | ADDER | | | |
| 7 | ADDER→A1 | | | SET PA |
| 10 | ADDER→A2 | | | |
| 11 | ADDER→I1 | | | |
| 12 | ADDER→I2 | | | |
| 13 | ADDER→CA, SET WRT | | | |
| 15 | REG. | NOT USED | JUMP ADDRESS | |
| 16 | 7 | 5 | JUMP ADDRESS | |
| 17 | RETURN ADDRESS | | | SET PA |

In the MODE 2 instructions indicated in Table VIII, the D and C fields generally specify the inputs to the adder, and the OP CODE specifies the destination of the adder output. The B and A fields respectively contain the address to be entered into the pad address register 94. OP CODES 0, 5, 14, 17 have no MODE 2. OP CODE 15 is a scan test of the register specified by the two most significant bits of the D field. OP CODE 16 (DC = 75) is a scan test of the S register. This scan test allows sequential testing of all bits in a register and exits upon finding a one bit. OP CODE 17 is the same as MODE 0 except, in addition, PA is set.

Table IX indicates the utility of MODE 3 instructions:

TABLE IX

| Mode 3 | | | | |
|---|---|---|---|---|
| OP Code | D Field | C Field | B Field | A Field |
| New Value of CA | | | | |

It will be noted that MODE 3 is used for only one operation, that is to set the value of the octal number in the OP CODE, D, C, B, and A fields into the core address register.

The foregoing tables VI through IX identify the significance of the OP CODES for each of the MODES 0, 1, 2, 3. The following tables define the significance of each of the D, C, B and A fields by OP CODE number. Attention is initially called to Tables Xa and Xb set forth hereinafter:

TABLE Xa.—IIIC. TABLES OF FIELD DEFINITIONS BY OP-CODE NUMBER

| | OP code 0 Table, Modes 0,1 | | | |
|---|---|---|---|---|
| Number | 13 12 11 D Field | 10 7 6 C Field | 5 4 3 B Field | 2 1 0 A Field |
| 0 | NO OP | NO OP | NO OP | NO OP |
| 1 | 0→I2 | 0→I1 | I1→A2→A1 | 0→A1 |
| 2 | NO OP | 0→FL | (*) | 0→A2 |
| | | | I1→A2→A1 | 0→A1 |
| 3 | 0→I2 | 0→I1 PA-1→PA | PDR*A1R | 0→A2 |

TABLE Xa.—IIIC.—Continued

TABLES OF FIELD DEFINITIONS BY OP-CODE NUMBER

| | OP code 0 Table, Modes 0,1 | | | |
|---|---|---|---|---|
| Number | 13 12 11 D Field | 10 7 6 C Field | 5 4 3 B Field | 2 1 0 A Field |
| 4 | NO OP | A1+0→I2<br>0→I1 | I2→PD | PD→I1 |
| 5 | 0→I2 | PA-1→PA<br>A1+0→I2<br>0→FL | I1→A2→A1<br>I2→PD | 0→A1<br>PD→I1 |
| 6 | NO OP | PA-1→PA<br>A1+0→I2<br>0→I1 | PDR*A1R<br>I2→PD<br>I1→A2→A1 | 0→A2<br>PD→I1<br>0→A1 |
| 7 | 0→I2 | PA-1→PA<br>A1+0→I2 | PDR*A1R<br>I2→PD | 0→A2<br>PD→I1 |

*PDR→M1, PD$_{17}$→M1F1, A1R→M2, A1$_{17}$→M2F1, Mp/2→A2, MS→A2F1.

TABLE Xb

SPECIAL PARALLEL INSTRUCTIONS

| Field | Bit No. | Operation |
|---|---|---|
| A | 0 | 0 → A1 |
| | 1 | 0 → A2 |
| | 2 | PD → I1 |
| B | 3 | I1 → A2 → A1 |
| | 4 | PDR*AIR (Multiply) |
| | 5 | I2 → PD |
| C | 6 | 0 → I1 |
| | 7 | 0 → FL |
| | 10 | A1 → I2, PA-1 → PA |
| D | 11 | 0 → I2 |
| | 12 | NO OP |
| | 13 | NO OP |

It will be noted that Tables X*a* and X*b* relate to OP CODE 0 for MODE 0. From Table VI, it will be recalled that in MODE 0, OP CODE 0 causes special parallel instructions to be executed as defined in detail by Tables X*a* and X*b*. The individual bits of each of the D, C, B and A fields identify operations to be executed. More particularly, it will be recalled that the A field is comprised of bits 0, 1 and 2. These three bits can define a binary value anywhere between 0 and 7. For each of these binary values indicated in the left-hand column of Table X*a*, the three bit A field will cause the operations indicated in the A field column to be executed. Thus for example, if bit 0 in the A field is a 1 then a 0 will be loaded into the A1 register as indicated by Table X*b*. Bit 2 of the A field is a 1 and bits 1 and 0 are both 0, and will of course mean the A field has a binary value of 4. Sighting to the right along row 4 of Table X*a*, it will be noted that the operation called for is to transfer the contents of the pad output lines into register I1. This operation is also represented in Table X*b* wherein it will be noted that a 1 in bit position 2 of the A field causes this operation. By way of further explanation, if all three bits of the A field are 1 then the three operations indicated in Table X*b* will occur and this is verified by sighting to the right along row 7 of Table 10a under the A field column.

Attention is now called to Tables XI, XII and XIII set forth hereinafter which respectively identify the operations to be executed in response to the various possible values of the A, B and C fields for OP CODES 1–13, MODES 0 and 1.

The interpretation of Tables XI, XII, and XIII should be readily apparent. By way of example, consider an exemplary instruction, e. g., MODE 0, OP CODE 1 with an A field value equal to 3. From Table VI it will be recalled that for OP CODE 1, the value of the three bit A field identifies a source of data to be transferred into the register I2. This is in agreement with Table XI which in the middle row indicates that for OP CODE 1, register I2 is the usual destination register. If the three bit A field, for example, defines a binary value of 3, then the contents of the I1 register is to be transferred into the I2 register. As a further example, if the three bit A field defined a binary value of 4, then the output of the multiplier would be transferred into the I2 register. Most of the other entries in Tables XI, XII and XIII can be similarly interpreted. Those entries depicted with a double box signify operations which do not transfer data into the usual destination register.

Table XIV set forth hereinafter identifies the significance of the three bit C field for OP CODES 1–4, MODE 2.

TABLE XI.—OP CODES 1-13 REGISTER OPERATIONS TABLE—MODES 0, 1

| USUAL DEST. REG. | A-FIELD 0 | 1 | 2 | 3 | 4 | 5 | 6 | 7 |
|---|---|---|---|---|---|---|---|---|
| A1, OP 3, 7, 10, 11 | NO OP | PD→A1 | AD→A1 | I1→A1 | A2→A1 | SET WRT<br>0→F(0),<br>F(10) 2 | PDR→A1R<br>0→A1L | PD(0–16)→<br>A1(0–16),<br>O→A1(17)<br>PD(17)→F(1) |
| I2, OP 1, 4, 12, 13 | NO OP | E2→I2R<br>0→I2L | AD→I2 | I1→I2 | MP→I2 | SET WRT 2 | CD→I1<br>1* | PA→E2 |
| PD, OP 2, 5, 6 | PD→PD1 | A1→PD | A2→PD | I1→PD | I2→PD | A1R→PDR | A1L→PDL | CA→PD |

TABLE XII

| USUAL DEST. REG. | B-FIELD 0 | 1 | 2 | 3 | 4 | 5 | 6 | 7 |
|---|---|---|---|---|---|---|---|---|
| A2, OP 2, 10, 12 | NO OP | AD→A2 | $\overline{AD}$→A2 | I1→A2 | MP/2→A2<br>MS→F(2) | SET WRT 2 | E1R→I1R<br>PDL→I1L | E1L→I1L<br>PDR→I1R |
| I1, OP, 5, 11, 13 | NO OP | E1→I1 | AD→I1 | CD→I1<br>1* | PD→I1 | DI→E1→I1<br>3 | E1R→I1R<br>0→I1L | E1L→I1L<br>0→I1R |
| M2, OP 3, 4 | NO OP | A1L→M2<br>F(1)→<br>F(5) | E1(0-7)<br>M2(7-0) | I1R→M2 | A1R→M2<br>F(1)→<br>F(5) | 0→M2<br>0→F(5) | MP/2→<br>A2<br>MS→F(2)* | A1L→M2<br>MP/2→A2<br>MS→F(2)* |
| PA, OP 1, 6, 7 | NO OP | PA+1→<br>PA | PA−1→<br>PA | I1(0–5)<br>→PA | E2→<br>PA | E2←→PA | PA−10→<br>PA | PA+10→<br>PA |

TABLE XIII

| USUAL DEST. REG. | C-FIELD | | | | | | | |
|---|---|---|---|---|---|---|---|---|
| | 0 | 1 | 2 | 3 | 4 | 5 | 6 | 7 |
| M1, OP 3, 4 | NO OP | PDL→M1 0→F(4) | MPL→M1 MS→F(4) | I1R→M1 | PDR→M1 PD(17)→ (F4) | 0→M1 0→F4 | IF PA=0, J+1→IA | PD(10-16)→ M1, 0→M1(7) PD(17)→F(4) |
| E OP 1, 2, 5 | NO OP | I2R→E2 | PA→E2 | 0→E1 | PDI→E1 | DI→E1 | PDR→E1R | E1R→E1L |

NOTES:
1. When CD→I1, bits 20 and 21 of CD are transferred into F(0) and F(10).
2. When SET WRT, I1, I1F1&2→CD when→CA.
3. T FIELD must be >1.
4. T FIELD must be >0.

TABLE XIV.—OP CODES 1-4 REGISTER OPERATIONS TABLE—MODE 2

| | C-FIELD | | | | | | | |
|---|---|---|---|---|---|---|---|---|
| | 0 | 1 | 2 | 3 | 4 | 5 | 6 | 7 |
| E, OP 1 | NO OP | I2R→E2 | PA→E2 | O→E1 | | DI→E1* | PDR→E1R | E1R→E1L |
| PD, OP 2 | DI→E1→PD** | A1→PD | A2→PD | I1→PD | I2→PD | A1R→PDR | A1L→PDL | CA→PD |
| PDI→E1, OP 3 | PD→E1* | A1→E1* | A2→E1* | I1→E1* | I2→E1* | A1→E1* | A1→E1* | CA→E1* |
| M1, OP4 | NO OP | PDL→M1 O→F(4) | MPL→M1 MS→F(4) | I1R→M1 | PDR→M1 PD(17)→ F(4) | O→M1 | IF PA=0, J+1→IA | PD(10-16)→ M1(0-6), O→M1(7) PD(17)→F(4) |

*T FIELD must be > 0 for these instructions.
**T FIELD must be > 1.

Attention is now called to Table XV set forth hereinafter which constitutes a fixed destination ADDER OPERATIONS table. From Table VI, it will be recalled that the ADDER OPERATIONS table is referenced in executing instructions having OP CODES 1–13, MODES 0, 1 and 2.

TABLE XV.—ADDER OPERATIONS TABLE I FIXED DESTINATION

OP CODES 1-13, MODES 0, 1, 2

| | C FIELD | | | | | | | |
|---|---|---|---|---|---|---|---|---|
| | 0* | 1 | 2 | 3 | 4 | 5 | 6 | 7 |
| D Field: 0 | NO OP | A1AA2→A2 | A2→CA | A2+1→A2 | A2-1→A2 | IF A1=A2, J+1→IA | IF A1<A2, J+1→IA | IF A1>A2, J+1→IA |
| 1 | A2SM/2C 1 →A2 | O→CA | −A2→A2 | A2 2C/SM 2 →A2 | I1-A2→A2 | IF A1=0, J+1→IA | A1-A2→A2 | $\overline{A2}$→A2 |
| 2 | A1+I2→I2 | A1AI2→I2 | I2→I1 | I2+1→I2 | I2-1→I2 | IF I2=O, J+1→IA | IF A1<I2, J+1→IA | IF A1>I2, J+1→IA |
| 3 | A1+PD→A1 | A1APD→A1 | PD→CA | PD+1→A1 | PD-1→A1 | IF A1=PD, J+1→IA | IF A1<PD, J+1→IA | IF A1>PD, J+1→IA |
| 4 | A1+A2→A2 | A1AA2→A1 | A1→A2 | A1+1→A1 | A1-1→A1 | IF A1R= A2R, J+1 →IA | (See 3) | A2→I1 |
| 5 | A1SM/2C 1 →A1 | A1VA2→A2 | −A1→A1 | A1 2C/SM 2 →A1 | I2-A1→A1 | A1$\overset{e}{V}$A2→A2 | A2-A1→A1 | A2-A1→A2 |
| 6 | A2+I1→I1 | A2AI1→I1 | I1→CA | I1+1→I1 | I1+I2→I1 | IF A2=I1, J+1→IA | IF A2<I1, J+1→IA | IF A2>I1, J+1→IA |
| 7 | A2+CA→CA | A2ACA→CA | CA→I1 | CA+1→CA | CA-1→CA | IF A2=CA, J+1→IA | IF A2<CA, J+1→IA | IF A2>CA, J+1→IA |

*OP CODES 1-5, this column only.

NOTE:
1. 16-bit SIGNED MAGNITUDE form is converted to 16-bit 2's COMPLEMENT.
2. 16-bit 2's COMPLEMENT form is converted to 16-bit SIGNED MAGNITUDE 16-bit SIGNED MAGNITUDE form is—

AKF1 AK

[ ] [16-bit magnitude]

sign,
0=positive
1=negative
K=1,2

16-bit 2's COMPLEMENT form is—

AK

[ ]

16-bit twos complement number, with AK(17)=sign

3. A1+A2+CF→A1, CARRY→CF. The Carry Flag and the Overflow Flag are set by any add operation which has a destination.

If J+1→IA, add 250 nsec to execution time—A=AND; V=OR; $\overset{e}{V}$=exclusive OR.

In order to interpret Table XV, consider, for example, an instruction having an OP CODE 7, MODE 0. Moreover, assume a D field value of 4 and a C field value of 3. These C and D field values will reference us to an entry in Table XV which indicates that the contents of the A1 register is incremented by 1 and then re-entered into the A1 register. It will be noted that all of the entries in Table XV specify both an operation, which determines the adder output AD, and a destination for the adder output. Attention is now called to Table XVI which constitutes a selected destination adder operations table which enables the instruction to specify a selected destination for the adder output.

It will be noted that the entries in Table XVI identify operations to be executed in response to identified C an D field values. The operations identified in Table XVI are identical to these identified in Table XV. The difference between Tables XV and XVI is that Table XV identifies destinations for the adder output as well as the operation to be performed by the adder. Table XVI does not identify the destination for the adder output but relies upon the A and B fields to identify a selected destination. When a selected destination is identified, it aborts the path to the normal destination register specified by Table XV.

More particularly, as an example, consider an instruction having an OP CODE 12, a D field equal to 4, and a C field equal to 2. Initially referencing Table XV, it can be noted that this D and C field configuration causes the content of the A1 register to appear at the output AD of the adder and then to be transferred into the register A2. If as part of this same instruction, the A field defined a value of 2 for example, then by referencing Table XI, it will be recognized that the adder output (in this case A1) instead of being transferred into register A2, will be transferred into register I2.

As a further example, again assume OP CODE 12 and D and C fields respectively having values 6 and 4. Referencing Table XV, it will be noted that the sum of the contents of registers I1 and I2 will appear at the output AD of the adder. This output will normally be directed to destination register I1 as represented in Table XV. However, if the A field has a value of 2, then the adder output (in this case the sum of register I1 and I2), will be directed into register I2.

It will be recalled from Table VI that OP CODE 14 identifies a load type instruction. Generally, load type instructions are utilized for transferring one or more words between components of the processor such as between the core memory, instruction pad, data pad, peripheral devices, etc. The detailed operations executed in response to each load type instruction are defined in detail by Table XVII.

TABLE XVI.—ADDER OPERATIONS TABLE II, SELECTED DESTINATION

OP CODES 1-13, MODES 0, 1, 2

| | C FIELD | | | | | | | |
|---|---|---|---|---|---|---|---|---|
| | 0* | 1 | 2 | 3 | 4 | 5 | 6 | 7 |
| D Field: | | | | | | | | |
| 0 | A1+A2 | A1AA2 | A2 | A2+1 | A2-1 | $A1\overset{en}{V}A2$ | $\overline{A1-A2}$ | A2-A1 |
| 1 | -A2 | 0 | -A2 | -A2 | I1-A2 | $\overline{A1}$ | A1-A2 | A2 |
| 2 | A1+I2 | A1AI2 | I2 | I2+1 | I2-1 | $\overline{I2}$ | $\overline{A1-I2}$ | I2-A1 |
| 3 | A1+PD | A1APD | PD | PD+1 | PD-1 | $A1\overset{en}{V}PD$ | $\overline{A1-PD}$ | PD-A1 |
| 4 | A1+A2 | A1AA2 | A1 | A1+1 | A1-1 | $A1\overset{en}{V}A2$ | (See 1) | A2 |
| 5 | -A1 | $\overline{A1VA2}$ | -A1 | -A1 | I2-A1 | $A1\overset{en}{V}A2$ | A2-A1 | A2-A1 |
| 6 | A2+I1 | A2AI1 | I1 | I1+1 | I1+I2 | $I1\overset{en}{V}A2$ | $\overline{A2-I1}$ | I1-A2 |
| 7 | A2+CA | A2ACA | CA | CA+1 | CA-1 | $CA\overset{en}{V}A2$ | $\overline{A2-CA}$ | CA-A2 |

*OP CODES 1-5, this column only.

NOTE.—
1. A1+A2+CF, CARRY→CF,
V=OR,
$\overset{en}{V}$=exclusive NOR,
A=AND.

TABLE XVII.—OP CODE 14 TABLE

OP CODE 14 MODE 0

| DC | Name | Function | T Field |
|---|---|---|---|
| 0 0 | DI→EI→PD, PA+1→PA | EI→PD, PA+1→PA | >2 |
| 1 0 | LOAD PD | CD→PD, CA+1→CA, PA+1→PA | 7 |
| 2 0 | STORE PD | CA+1→CA, PD→CD, PA+1→PA | 7 |
| 4 0 | LOAD PD OCT | CD→PD, CA+1, PA+10→PA | 7 |
| 6 0 | SET E2 | IB(0-7)→E2 | |
| 7 0 | ENABLE I/0 | IB(0-6)→D(0-6), 1→D(7); 0→D(7) at TC=0; If A FIELD=0, IB(7)→S(0) at TC=T-1. | >2 |
| 0 4 | (1) | E1→I1, 0 & E2→I2, I2 & I1→ID, IA+1→IA | |
| 1 4 | LOAD MACRO [1] | CD(0-13)→IR(TMJ), CA+1→CA, CD→IR(0-17), CA+1→CA, IA+1→IA. | 17 |
| 2 4 | LOAD PD MACRO [1] | PD(0-13)→IR(TMJ), PA+1→PA, PD→IR(0-17), PA+1→PA, IA+1→PA. | 1 |
| 4 4 | WAIT | WAIT # WORDS -1 CLOCK TIMES | |
| 6 4 | HALF EXECUTE [2] | CD→IB, IR(TMJ)→TC, IM, IA | 7 |
| 7 4 | FULL EXECUTE [2] | CD(0-13)→TC, IM, IA, CA+1→CA, CD→IB, CA+1→CA | 17 |
| | MODE 1 is the same as above except for the following: | | |
| 7 0 | ENABLE I/0 | IB(0-6)→D(0-6), 1→D(7); IF A FIELD=0, IB(7)→S(0) at TC=T-1. | >1 |
| | IF CD→( ), I1F1&2, I1 are used. IF ( )→IR, I1&I2 are used. IF ( )→PD, I1 is used. | | |

Notes: [1] The last instruction is moved to IB and is executed.
[2] # words -1 must=0.

It will be recalled from Table VI that OP CODE 15, MODE 0 and 1, instructions define bit tests. Table XVIII set forth hereinafter indicates the particular bit test defined by an OP CODE 15, MODES 0, 1 instruction for different configuration D and C fields. That is, the value of the D and C fields identifies a particular bit to be tested. If that tested bit matches the MODE, i.e. the condition is met, then the jump address specified by the A and B fields of that instruction is loaded into the instruction pad address register. If the tested bit doesn't match the MODE meaning that the condition is not met, then the field of the instruction defines the address of the next instruction.

TABLE XVIII

OP CODE 15 TABLE

OP CODE 15, MODES 0,1

| D Field | Specifies Register | C Field | Tests Bit No. |
|---|---|---|---|
| 0 | FR | 0 | 0 |
| 1 | FL | 1 | 1 |
| 2 | A2R | 2 | 2 |
| 3 | A2L | 3 | 3 |
| 4 | I1R | 4 | 4 |
| 5 | I1L | 5 | 5 |
| 6 | E1R | 6 | 6 |
| 7 | E1L | 7 | 7 |

Attention is now called to Table XIX which illustrates the operation to be performed in response to an OP CODE 15, MODE 2 instruction. This instruction allows the testing of each bit of four different registers, i.e. flag (F), A2, I1, E1, in sequence, for a 1 bit. The D field of a scan test (i.e. OP CODE 15, MODE 2) instruction identifies the desired one of the four registers. In scanning, when a 1 bit is encountered, the pad address is decremented and the next instruction is loaded from the instruction pad location given by the jump address. If, in scanning, no 1 bit is encountered, the pad address is decremented and the instruction address by the J field is next accessed. It will be recalled from Table VI that OP CODE 16, MODE 0, 1 instructions normally identify conditional tests and in the event the test is met, then the jump address designated by the A and B fields is used to access the next instruction. Thus, OP CODE 16 is similar to OP CODE 15 except that OP CODE 16 enables several different tests to be defined as represented in Tables XX and XXI.

TABLE XIX.—OP CODE 15, MODE 2

| D Field | Specifies Register |
|---|---|
| 0 | F=FL+FR |
| 2 | A2 |
| 4 | I1 |
| 6 | E1 |

PA contains the number of the bit to be tested. The T-field must be zero.
If the bit tested=1, BA→IA and PA-1→PA.
If the bit tested=0 and PA≠0, J→IA and PA-1→PA.
If the bit tested=0 and PA=0, J+1→IA and PA=76.

REGISTER ASSIGNMENT OF FLAGS

| | FL | | | | | | | | FR | | | | | | | | |
|---|---|---|---|---|---|---|---|---|---|---|---|---|---|---|---|---|---|
| I1 (0) | SF2 | DF2 | M2F2 | M1F2 | I2F2 | A2F2 | A1F2 | I1F2 | SF1 | DF1 | M2F1 | M1F1 | I2F1 | A2F1 | A1F1 | I1F1 | I1 (17). |
| | 17 | 16 | 15 | 14 | 13 | 12 | 11 | 10 | 7 | 6 | 5 | 4 | 3 | 2 | 1 | 0 | |

TABLE XX

OP CODE 16 TABLE—MODE 0

| | C-FIELD | | | | | | | |
|---|---|---|---|---|---|---|---|---|
| | 0 | 1 | 2 | 3 | 4 | 5 | 6 | 7 |
| D FIELD: | | | | | | | | |
| 0 | IF OCT=0,** BA→IA | IF OCT=1, BA→IA | IF OCT=2, BA→IA | IF OCT=3, BA→IA | IF OCT=4, BA→IA | IF OCT=5, BA→IA | IF OCT=6, BA→IA | IF OCT=7, BA→IA |
| 1 | IF S=0, BA→IA | IF E1≠0, BA→IA | IF PA=0, BA→IA | IF SYNC=0,* BA→IA | IF A1(16)= A1(17), BA→IA | IF I1(16)=I1(17), BA→IA | IF MS=0, BA→IA | IF A1(17)=0, BA→IA |
| 2 | IF TR(17)=0, BA→IA | IF A1(0)=0 BA→IA | IF I2(17)=0, BA→IA | IF CF=0, BA→IA | IF OF=0 BA→IA | | | |
| 3 | IF F3(10)=0 BA→IA | IF E3(11)=0 BA→IA | IF E3(12)=0 BA→IA | IF E3(13)=0 BA→IA | IF S(A)=0, J+1→IA | IF S(PA)=0, BA→IA | IF D(7)=0, BA→IA | IF A2L=0 BA→IA |
| 4 | SHIFT (See Table I) | SHIFT FLAGS (See Table V) | 0→I1F1 0→I1F2 | TRANSFER I1 FLAGS (See Table II) | 1→S(A) | 1→S(PA) | 1→D(7) | 1→F(BA) |
| 5 | MEMORY CONTROLS (See Table III) | | | | | | E1R→S 0→E1R | 0→E1L |
| 6 | E1R→S | MP→I2 E1R→E1L | | →PD (See Table IV) | 0→E1, E2 | | | |
| 7 | If E3(10)=0, BA→IA | If E3(11)=0, BA→IA | If E3(12)=0, BA→IA | If E3(13)=0, BA→IA | IF S(A)=0, J+1→IA, 1→S(A) | IF S(PA)=0, BA→IA, 1S→(PA) | IF D(7)=0, BA→IA, 1→D(7) | If A2L=0, BA→IA |

*SYNC=1 for exactly one clock at a time interval determined by the contents of TI. (See Section V G, Timer Instructions).
**OCT=PA(3-5).

NOTES:
If BA→IA, add 125 nsec to execution time.
If J+1→IA, add 250 nsec to execution time.
Instructions whose results are not designated are undefined; their results are indeterminate.
MODE 1: In general, Under MODE 1 tests for equality become tests for inequality, and instructions which set a bit=0, set it=1.

TABLE XXI

OP CODE 16 TABLE—MODE 1

| | C-FIELD | | | | | | | |
|---|---|---|---|---|---|---|---|---|
| | 0 | 1 | 2 | 3 | 4 | 5 | 6 | 7 |
| D FIELD: | | | | | | | | |
| 0 | IF OCT≠0,** BA→IA | IF OCT≠1, BA→IA | IF OCT≠2, BA→IA | IF OCT≠3, BA→IA | IF OCT≠4, BA→IA | IF OCT≠5, BA→IA | IF OCT≠6, BA→IA | IF OCT≠7, BA→IA |
| 1 | IF S≠0, BA→IA | IF E1=0, BA→IA | IF PA≠0, BA→IA | IF SYNC=1,* BA→IA | IF A1(16)≠ A1(17), BA→IA | IF I1(16)≠ I1(17), BA→IA | IF MS=1, BA→IA | IF A1(17)=1, BA→IA |
| 2 | IF TR(17)=1, BA→IA | IF A1(10)=1, BA→IA | IF I2(17)=1, BA→IA | IF CF=1, BA→IA | IF OF=1, BA→IA | | | |
| 3 | IF E3(10)=1 BA→IA | IF E3(11)=1 BA→IA | IF E3(12)=1 BA→IA | IF E3(13)=1 BA→IA | IF S(A)=1, J+1→IA | IF S(PA)=1, BA→IA | IF D(7)=1, BA→IA | IF A2L≠0 BA→IA |
| 4 | SHIFT (See Table I) | SHIFT FLAGS (See Table V) | 0→I1F1 0→I1F2 | TRANSFER I1 FLAGS (See Table II) | 0→S(PA) | 0→S(PA) | 0→D(7) | 0→F(BA) |
| 5 | MEMORY CONTROLS (See Table III) | | | | | | E1R→S 0→E1R | 0→E1L |
| 6 | E1R→S | MP→I2 E1R→E1L | | →PD (See Table IV) | 0→E1, E2 | | | |
| 7 | If E3(10)=1, BA→IA | If E3(11)=1, BA→IA | If E3(12)=1, BA→IA | If E3(13)=1, BA→IA | IF S(A)=1, J+1→IA, 0→S(A) | IF S(PA)=1, BA→IA, 0→S(PA) | IF D(7)=1, BA→IA, 0→D(7) | IF A2L=0, BA→IA |

*SYNC=1 for exactly one clock at a time interval determined by the contents of TI. (See Section V G, Timer Instructions).
** OCT=PA(3-5).

NOTES:
If BA→IA, add 125 nsec to execution time.
If J+1→IA, add 250 nsec to execution time.
Instructions whose results are not designated are undefined; their results ar indeterminate.

OP CODE 16 TABLES, MODES 0 AND 1

Instructions whose results are not designated are undefined

| | D Field | C Field |
|---|---|---|
| I | 4 | 0 |

SHIFT

| B Field | | A Field | |
|---|---|---|---|
| 0 NO OP | | 0 NO OP | |
| 1 LSA1, Fill w/zero | A1 | 1 LSI1, Fill w/zero | I1 |
| 2 LSA1, Fill w/$A1_{17}$ | A1 | 2 LSI1, Fill w/$I1_{17}$ | I1 |
| 3 LSA1, Fill w/$I1_{17}$ | A1 | 3 LSI1, Fill w/$A1_{17}$ | I1 |
| 4 RSA2, Fill w/zero | A2 | 4 RSI2, Fill w/zero | I2 |
| 5 RSA2, Fill w/$A2_{17}$ | A2 | 5 RSI2, Fill w/$I2_{17}$ | I2 |
| 6 RSA2, Fill w/$A2_0$ | A2 | 6 RSI2, Fill w/$I2_0$ | I2 |
| 7 RSA2, Fill w/$I2_0$ | A2 | 7 RSI2, Fill w/$A2_0$ | I2 |
| LS=left shift | | | |
| RS=right shift | | | |

| | D Field | C Field |
|---|---|---|
| II | 4 | 3 |

TRANSFER I1 FLAGS

| B Field | A Field |
|---|---|
| 0 NO OP | 0 NO OP |
| 1 A1F1→I1F1, A1F2→I1F2 | 1 I1F1→A1F1, I1F2→A1F2 |
| 2 A2F1→I1F1, A2F2→I1F2 | 2 I1F1→A2F1, I1F2→A2F2 |
| 3 I2F1→I1F1, I2F2→I1F2 | 3 I1F1→I2F1, I1F2→I2F2 |
| 4 M1F1→I1F1, M1F2→I1F2 | 4 I1F1→M1F1, I1F2→M1F2 |
| 5 M2F1→I1F1, M2F2→I1F2 | 5 I1F1→M2F1, I1F2→M2F2 |
| 6 DF1→I1F1, DF2→I1F2 | 6 I1F1→DF1, I1F2→DF2 |
| 7 SF1→I1F1, SF2→I1F2 | 7 I1F1→SF1, I1F2→SF2 |

OP CODE 16 TABLES, MODES 0 and 1

| | D Field | C Field | |
|---|---|---|---|
| III. | 5 | 0 | |
| | | | MEMORY CONTROLS |
| | | A Field | |
| | | 0 | Clear WRT, BUF, RMW |
| | | 1 | SET WRT (write mode) |
| | | 2 | SET BUF (buffer or split mode) |
| | | 3 | SET RMW (read-modify-write mode) |

WRT = write mode. At the next core initiate, the contents of I1 will be written into the core cell addressed and WRT will be cleared. (I1 must remain unchanged for three clock times after the core initiate.)

BUF = buffer or split mode. The memory operates in buffer or split mode instead of the normal full mode (Read-Restore or Clear-Write): Read-Clear, the contents are read correctly, but the core cell is set to ones after the read; Merge-Write, I1 is anded with the contents in the core cell. BUF mode affects and is cleared by the next core initiate. Cycle time for buffer mode is 625 nsec, or 5 clock times, instead of the 1 usec, or 8 clocks, normally required.

RMW = read-modify-write mode. In this mode the contents of a selected cell are read as in the normal Read-Restore cycle. It is, however, possible to alter the data in I1 and to store the altered data into the selected cell by executing a CA+0 → CA instruction. RMW mode is cleared at the end of the read-modify-write cycle. The minimum cycle time for this operation is 1.125 usec, or 9 clocks.

As an example of how to interpret Tables XX and XXI, consider an OP CODE 16, MODE 0 instruction. This refers to Table XX and as an example, if a C field equal to 2 and a D field equal to 1 are defined by the instruction, then the test is to determine if the contents of the pad address register is equal to 0. If the condition is met, then the jump address contained in the A and B fields is transferred to the instruction address register. It is also pointed out that OP CODE 16 is utilized to cause certain actions such as shift (DC = 40), transfer flags (DC = 43), core control (DC = 50), transfer into pad (DC = 63), and shift flags (DC = 41).

Table XXII illustrates the test conditions for a scan test instruction OP CODE 16, MODE 2. This instruction is a scan for 1 test operating on the S register. The pad address contains the number of the bit to be tested.

OP CODE 16 TABLES, MODES 0 AND 1

Instructions whose results are not designated are undefined

| | D Field | C Field | |
|---|---|---|---|
| IV | 6 | 3 | →PD |

| B Field | | A Field |
|---|---|---|
| NOT USED | Right halfword writes | 0 E2→PDR |
| | | 1 M1→PDR |
| | | 2 M2→PDR |
| | | 3 S→PDR |
| | Full writes | 4 CD→PD |
| | | 5 $A2_{0-16}$→$PD_{0-16}$; if $TR_{17}=0$, $A2_{17}$→$PD_{17}$; if $TR_{17}=1$, 0→$PD_{17}$ |
| | | 6 E1→PD |
| | | 7 $A1_{0-16}$, A1F1→$PD_{17}$ |

| | D Field | C Field |
|---|---|---|
| V | 4 | 1 |

SHIFT FLAGS

| B Field | A Field |
|---|---|
| 0 NO OP | 0 |
| 1 LSA1, fill w/A1F1 | 1 LSI1, fill w/I1F1 |
| 2 | 2 LSI1, fill w/F(17); LSF, fill w/I1(17) (I1, F rotate) |
| 3 | 3 |
| 4 RSA2, Fill w/CF | 4 RSI2, fill w/I2F1 |
| 5 | 5 |
| 6 | 6 |

TABLE XXII

OP CODE 16, MODE 2

| D Field | C Field |
|---|---|
| 7 | 5 |

If the bit tested = 1, BA → IA and PA-1 → PA.
If the bit tested = 0 and PA ≠ 0, J → IA and PA-1 → PA.
If the bit tested = 0 and PA = 0, J+1 → IA and PA = 76.
All other OP CODE 16's, MODE 2 are not defined; their results are indeterminate.

OP CODE 17 defines a link jump instruction and is employed to allow jumping to other programs in the instruction pad and returning to a selected place in the instruction pad. In executing the link jump instruction, the D and C fields of the instruction is entered into the address portion of the instruction pad location addressed by the J field of the link jump instruction. The instruction just written is not executed but, in the case of MODE 0, causes the instruction address register to be incremented so that the next instruction can be executed. If the MODE = 1, the address of the next instruction is taken from the B and A fields.

From the foregoing, it should be understood that the indicated operations and register transfers are of course achieved by enabling selected gates in response to control signals produced by the instruction decoding means of the control unit 20. More particularly, in response to each different OP CODE instruction type, a different set of OPERATION field (A, B, C, D) decoder circuits is selected. In turn, each decoder circuit of a selected set responds to the three bit content of a particular OPERATION field to enable selected normally open gates of a group of such gates associated with that decoder circuit. The gates within a group respectively accept input data from different registers but provide output data along a common path to the input of a particular register. Continuing reference will now be made to FIGS. 6, 7 and 8 which demonstrate in detail the data paths formed within the processor in response to instructions having exemplary MODE and OP CODE field values.

Figure 6:
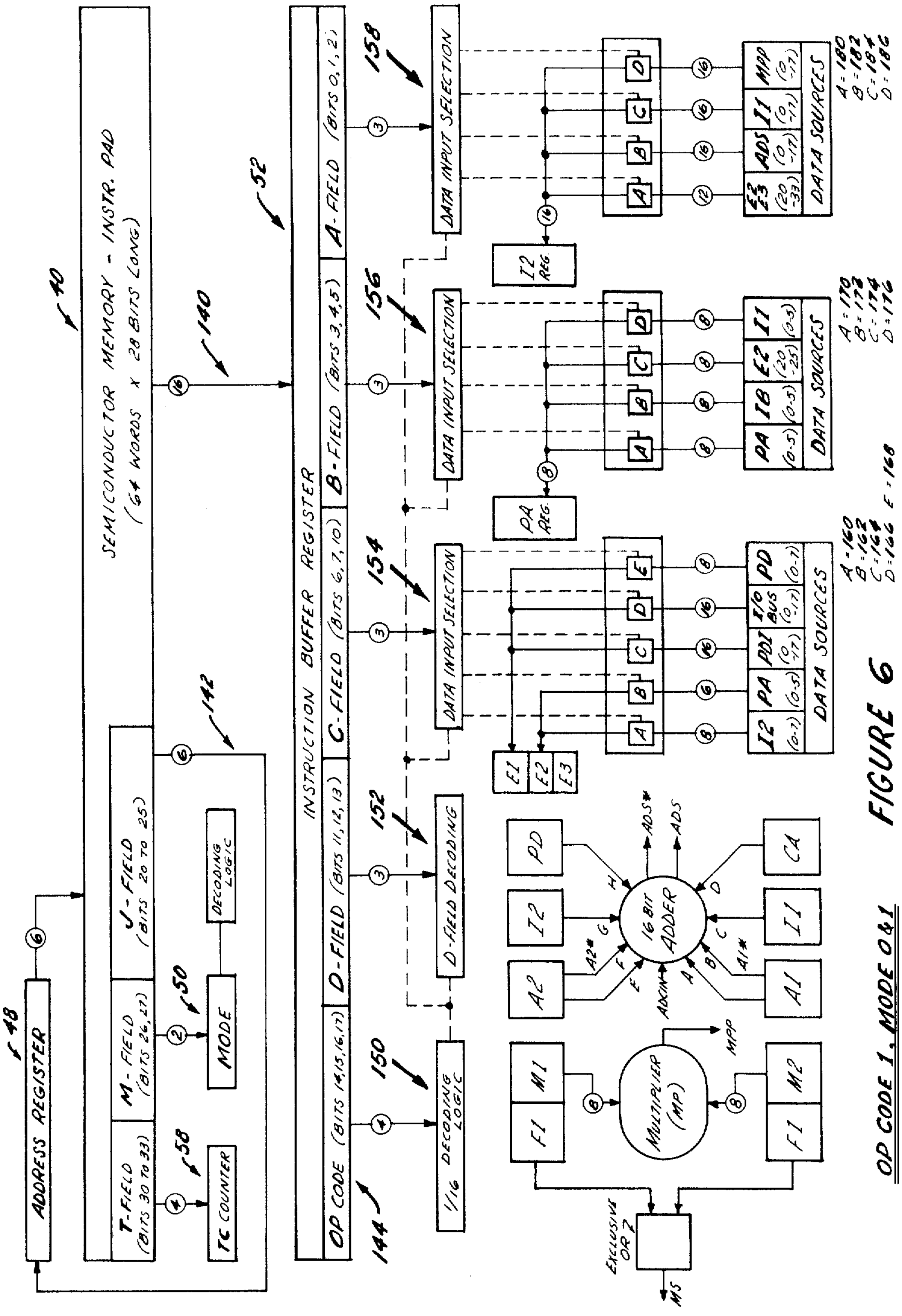
FIG. 6 is a block diagram illustrating the portions of the control and timing unit and arithmetic unit active during the execution of a particular, but exemplary, instruction.

More particularly, initial attention is called to FIG. 6 which illustrates in block form, the portions of the processor which come into play in the execution of an exemplary instruction contained within the instruction buffer 52 having a MODE field equal to 0 to 1 and an OP CODE field equal to 1.

Referring to Table VI, it will be noted that for MODE 0, OP CODE 1, the following significance is attributed to the D, C, B and A fields:

D field defines a particular operation within Column 0 of the adder operations Table XV;

C field defines the source of data to be transferred into the E1 register of the I/O interface unit 26;

B field defines the source of data to be transferred into the pad address register 94 of the arithmetic unit 24;

A field defines the source of data to be transferred into the I2 register of the arithmetic unit 24.

Prior to considering the detailed operations executed in response to exemplary values contained within the three bit D, C, B and A fields of an active instruction within the instruction register 52, attention is directed to FIG. 6 which illustrates those elements in the processor which primarily participate in the execution of instructions characterized by a MODE of either 0 or 1 and an OP CODE of 1.

The semi-conductor instruction pad 40 is represented in FIG. 6 by a large box partitioned into areas representing the T, MODE, J, OP CODE, D, C, B, and A fields of the instruction format. As previously discussed, the instruction pad has 64 locations, each storing instruction word. A six bit address stored in the instruction address register 48 uniquely identifies one of the 64 instruction pad locations for accessing an instruction word therefrom.

Note from FIG. 6 that bits 0 – 17 are transferred via lines 140 to the instruction buffer 52. More particularly, bits 0 – 2 of the accessed instruction word are loaded into the lower three stages of the instruction register while the bits from each of the B, C, D and OP CODE are loaded into successively higher stages of the instruction buffer. Bits 20 – 25 of the accessed instruction word are read out of the instruction pad via lines 142 and are transferred into the instruction address register 48. Note that instruction word bits 20 – 25 constitute the instruction address and are stored in the six bit positions of the register 48. Instruction word bits 26 and 27 constitute the MODE field and are stored in the MODE register 50. Bits 24 – 27 of the accessed instruction word are transferred via lines 144 into the time counter 58.

As shown in FIG. 6, decoding circuitry is provided responsive to each of the fields of the instruction register. More particularly, a decoding circuit 150 is provided responsive to the four bit OP CODE field. The decoding circuit 150 determines which of 16 possible OP CODES is defined by the OP CODE field stored in the high order four stages of the instruction buffer 52. As has already been mentioned, the four bit OP CODE represented in FIG. 6 identifies an OP CODE of 1. The output of the decoding circuit 150 is communicated to and controls decoding circuits 152, 154, 156 and 158, respectively responsive to the three bit D, C, B, and A fields of the instruction register 52. The decoding circuits 152, 154, 156, 158 decode the respective three bits of the instruction and in response thereto control arithmetic unit gating to effect various operations to be described.

Considering initially the D field decoding circuit 152, note from Table VI that for an OP CODE of 1, the three bit D field identifies a particular operation indicated in the column 0 of the ADDER OPERATIONS Table XV. More particularly, note the eight operation entries in column 0 of Table XV and particularly, the input and output terms required in the execution of these operations. These terms are illustrated in FIG. 6 as constituting inputs to the 16 bit adder of the arithmetic unit. More particularly, note that arithmetic unit registers A1, I1, A2, and I2 all have inputs which can be selectively applied to the adder depending upon the content of the 3 bit D field. Additionally, the output lines PD of the data pad memory 90 are also coupled to the adder input. Further, the output of the core address register 70 of the core memory unit 22 is also connected to the adder input. The particular operation to be executed by a 3 bit D field value can be ascertained from column 0 on Table XV. For example, if the D field has a value of 2, then the content of the A1 and I2 registers are added and the sum AD is entered into register I2.

Concurrently with the operation being performed in response to the D field value, operations are also performed in response to the C, B, and A field values as controlled by the decoder circuits 154, 156 and 158. From Table VI, it will be recalled that for OP CODE 1, the C field, B field and A fields respectively identify sources from which data is to be transferred into the E1, pad address, and I2 registers.

Note in FIG. 6 that the C field decoding circuit 154 has a plurality of output terminals respectively controlling gates or data ports 160, 162, 164, 166 and 168. Data from different sources is constantly held available at each of these data ports and a particular port is selected for data transfer by the decoding circuit 154. Thus for example, if the C field has a value of six, it can be seen from Table XIII that it is necessary to enable gate 168 to couple the eight right output lines PD of the data pad memory to the E1 register. The decoding circuit 154 is wired, of course, so as to respond to the C field value to enable the gating illustrated in FIG. 6 to effect the register transfer represented in Table XIII. As a further example, if the C field had a value of 2, then gate 162 would be enabled so as to transfer the pad address PA into the E2 register.

As a further example, assume that the B field has a value of 1. Referring to Table XII, it will be noted that for OP CODES of 1 and a B field of 1, the pad address is to be incremented by 1. This requires that the decoding circuit 156 enable gate 170 in order to couple the output of the data pad address register 94 to its input. As represented in FIG. 4, this path is connected so as to automatically increment the address. The decoding circuit 156 controls three other data ports respectively represented by gates 172, 174 and 176. For example, if the B field defines a value of 4, then gate 174 is enabled to transfer bits 20 – 25 of the E2 register into the pad address register.

Table XI illustrates the operation to be executed in response to the A field content. Note that decoding circuit 158 responsive to the A field in FIG. 6 selectively controls ports 180, 182, 184 and 186 for transferring information into register I2. For example, if the A field value equals 3, gate 184 is enabled to transfer the contents of register I1 into register I2. Similarly if the A field has a value equal to 2, decoding circuit 158 would enable gate 182 to couple the adder output AD to the register I2. Thus, the relationship between Table II and FIG. 6 should now be appreciated. That is, for a MODE 0 operation as defined by Table II, and for an OP CODE 1, the three bit C, B, and A fields will respectively define the sources of information to be transferred into the E1, pad address and I2 registers. From the foregoing, it should now be apparent that block diagrams, similar to FIG. 6, illustrating data transfer paths for each different OP CODE can be drawn based on the afore set forth operations tables.

Figure 7:
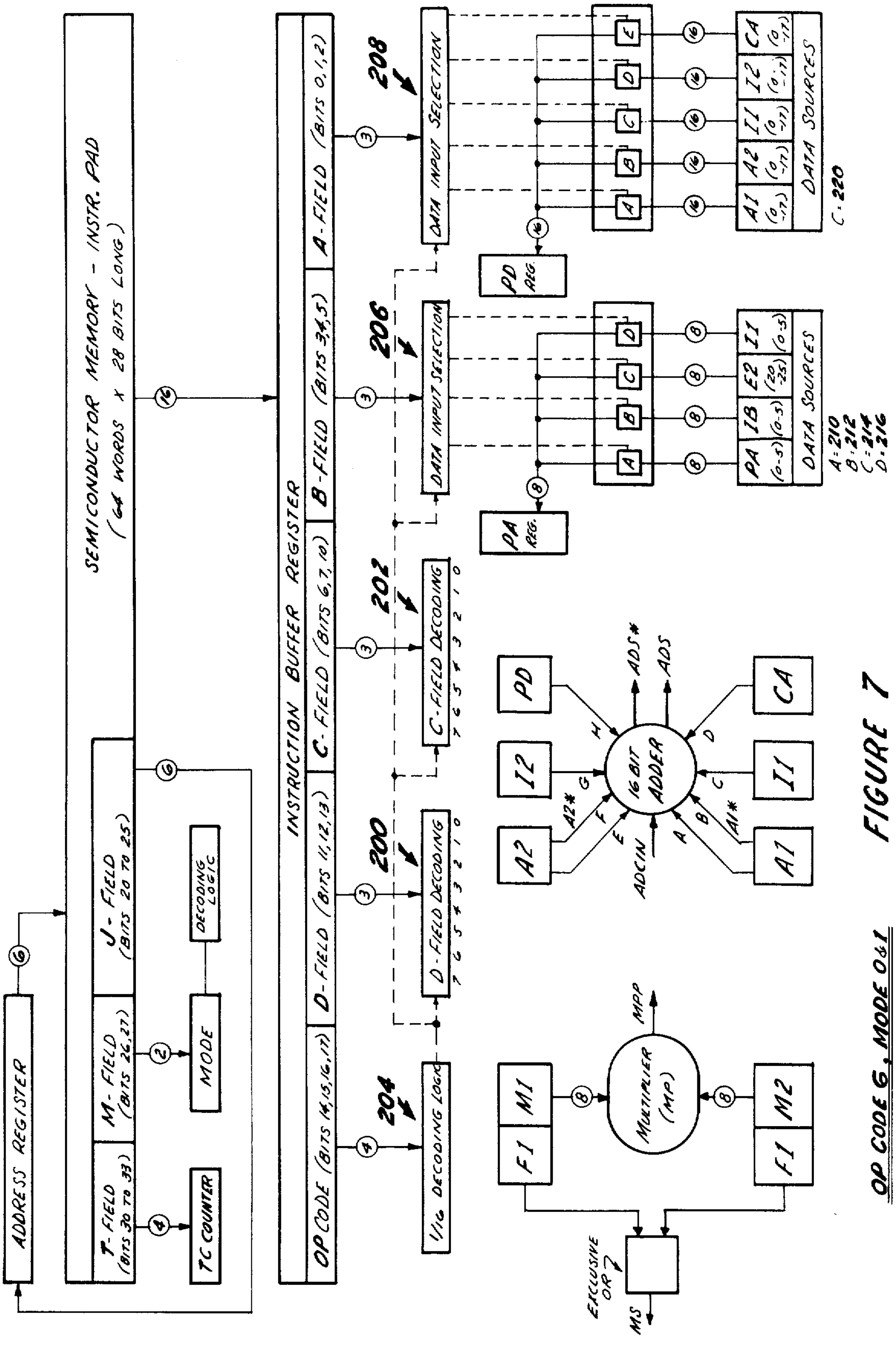
FIG. 7 is a block diagram illustrating the portions of the control and timing unit and arithmetic unit active during the execution of a further exemplary instruction.
Figure 8:
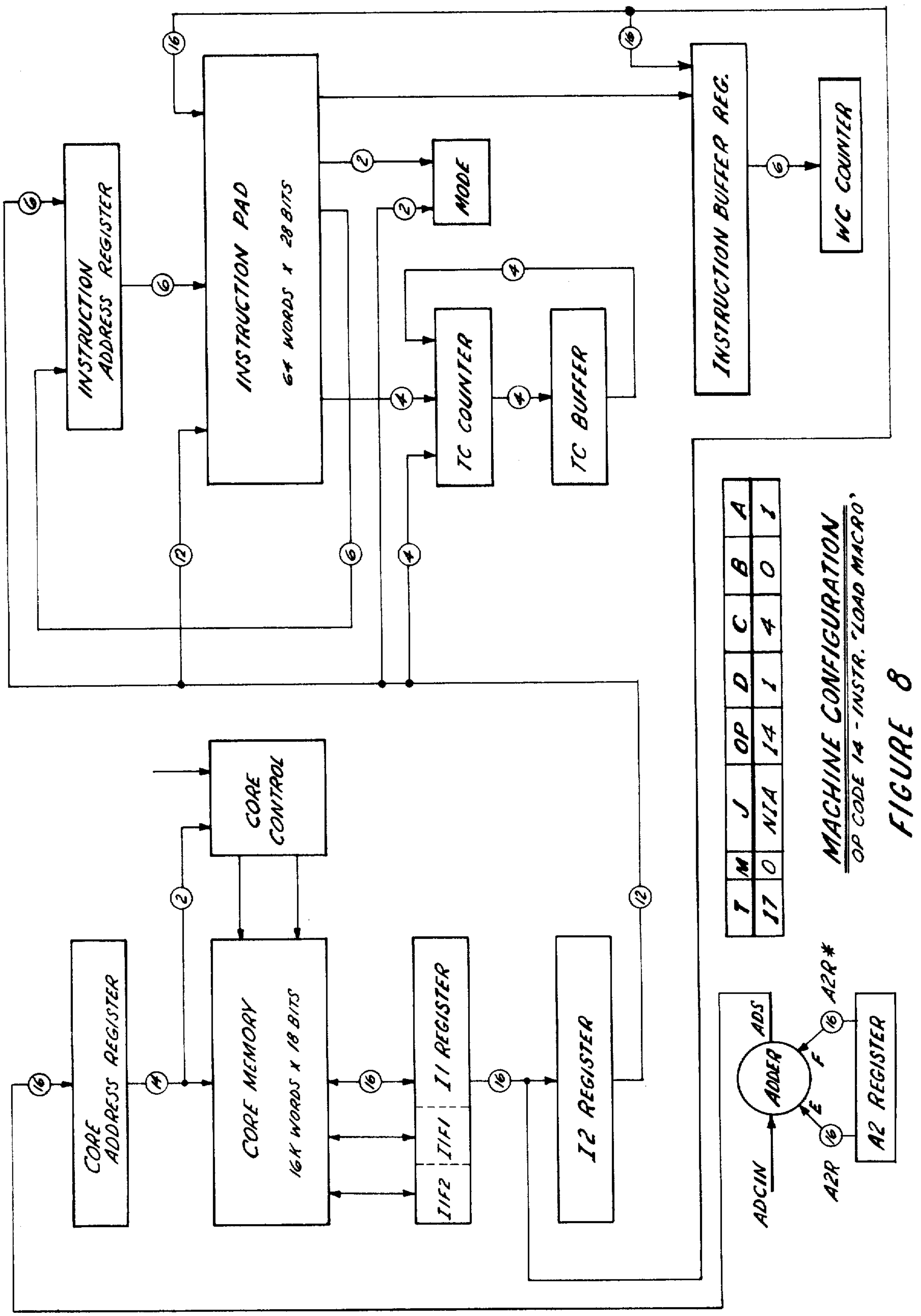
FIG. 8 is a block diagram illustrating portions of the processor active during the execution of a LOAD MACRO instruction.

As one further example, attention is directed to FIG. 7 which constitutes a block diagram illustrating the data transfer paths for an instruction of OP CODE 6, MODE either 0 or 1. Note from Table VI, that for OP CODE 6, and the D and C field values respectively identify operations defined by adder operations Table XV. The B and A field values respectively identify the sources of data to be transferred into the pad address register 94 and the data pad bus 98.

Initially considering the D and C fields, let it be assumed that the B field has a value of 0 and the C field has a value of 4. Referring to Table XV, we note that the arithmetic operation to be performed calls for the contents of the register A2 to be decremented by 1 with the result being re-entered into the A2 register. The transfer paths to the adder for accomplishing this operation are set up by the D and C field decoding circuits 200 and 202 of FIG. 7, both of which are responsive to the output of the OP CODE decoding circuit 204 indicating an OP CODE of 6.

The B and A fields are decoded by circuits 206 and 208 respectively of FIG. 7A. Decoding Circuit 206 controls four gates 210, 212, 214, 216 controlling four input ports to the pad address register 94. Assume for example that the B field has a value of 4. Referring to Table XI, it will be noted that this requires that the decoding circuit 206 enable gate 214 to thus transfer bits 25 – 20 of the E2 register into the pad address register.

The A field decoding circuit 208 similarly controls a plurality of the gates which can selectively couple data from several different sources into the data pad memory 90. From Table XI and FIG. 7, we note for example that if the A field has a value of 3, the decoding circuit 208 will enable gate 220 to couple the output of register I1 to the data pad memory.

As a consequence of the foregoing, it should be apparent that Tables XI – XXII teach the data paths to be established for each possible instruction and accordingly, it is not felt necessary to provide a drawing of the type shown in FIGS. 6 and 7 for each such instruction. However, as one further example, an instruction (LOAD) of special interest will now be discussed with reference to FIG. 8. More particularly, assume an instruction as follows:

| T | J | OP | D | C | B | A |
|---|---|---|---|---|---|---|
| 17 | 38 | 14 | 1 | 4 | 0 | 1 |

It will be recalled from Table XVII that an OP CODE 14 instruction having D, C field values of 1 and 4 respectively calls for loading the instruction pad with a block of instructions (macro) from the core memory. The A and B field value (i.e. 1) represents the number of words, minus one, to be loaded into the instruction pad. The T field must be 17 to give time for two core accesses per 28 bit instruction word to be loaded. The J field gives the address of the first cell in the instruction pad to be loaded. The following words are loaded into consecutive addresses in instruction pad.

The words to be loaded are stored in consecutive addresses in core. One instruction word being 28 bits long requires two cells in core. The T and J portion are stored in the first cell and the remaining 16 bits in the following cell.

As with all instruction, bits 17 – 0 are loaded into the instruction buffer 44 to be decoded. The J field is loaded into the instruction address register 40 and the T field loaded into the TC counter 58. The word count, bits 7 – 0 in the instruction buffer is then loaded into the word counter 60, and the contents of TC (i.e. 17) is loaded into the TC buffer register 59. The TC counter is used to provide the timing for the core memory.

After the TC counter times out a core cycle time, the core memory output is transferred to I1 and the address register is incremented, I1 is transferred to I2 and a core read is initiated. After the TC counter times out another core access time, core is read into I1. I1 and I2 are then both transferred to instruction pad. The word counter is decremented, and 17 is loaded into the TC counter from the TC buffer.

The above process is repeated until the word counter reads zero. When the TC counter reaches zero, and WC is zero, the last instruction loaded is executed by transferring I1 to the instruction buffer, I2 bits (7 – 0) to the instruction address register, and I2 bits 13 – 10 into the TC counter.

What is claimed is:

1. A data processing system including:

instruction pad memory comprised of a plurality of locations, each capable of storing a multibit instruction word;

an instruction address register means for uniquely identifying one of said instruction pad locations to produce a representation of the instruction word stored therein on output lines of said instruction pad, each of said instruction word representations including representations of a multibit ADDRESS field, a multibit OP CODE field and two or more multibit OPERATION fields;

a multistage instruction buffer;

means for storing said representations of said OP CODE and OPERATION fields in said instruction buffer;

a plurality of sets of OPERATION decoder circuits, each circuit in a set being responsive to a different OPERATION field stored in said instruction buffer;

OP CODE decoder means responsive to said OP CODE field stored in said instruction buffer for enabling a particular set of OPERATION decoder circuits identified thereby;

a plurality of data registers having input lines and output lines;

a plurality of normally disabled gating circuit groups, each such group being coupled to and controlled by a different OPERATION decoder circuit;

each gating circuit group comprised of a plurality of gating circuits each having input and output lines;

means connecting the gating circuit output lines of each gating circuit group in common and to the input lines of one of said data registers;

means connecting the input lines of each gating circuit within a group to different data register output lines;

timing means for providing spaced clock pulses defining successive processor cycles; and means responsive to said timing means for causing said OPERATION decoder circuits to simultaneously enable selected gating circuits identified by said stored OP CODE and OPERATION fields during each processor cycle.

2. The data processing system of claim 1 including a data pad memory comprised of a plurality of locations, each capable of storing a multibit data word;

pad address register means for uniquely identifying one of said data pad locations to selectively either produce a representation of the data word stored therein on output lines of said data pad or store a representation therein of a data word represented on input lines of said data pad;

means connecting said data pad output lines to the input lines of certain ones of said gating circuits; and means connecting the output lines of at least one of said gating circuit groups to said data pad input lines.

3. The data processing system of claim 2 wherein said pad address means comprises one of said data registers.

4. The data processing system of claim 2 including a third memory comprised of a number of information storage locations significantly greater than the number of locations in said instruction memory;

third memory address register means for uniquely identifying one of said third memory locations to selectively either produce a representation of the information stored therein on output lines of said third memory or store a representation therein of information represented on input lines of said third memory; and means connecting said third memory output lines to the input lines of certain ones of said gating circuits.

5. A data processing system including:

an instruction memory having a plurality of storage locations each capable of storing an instruction word comprised of a multibit OP CODE field and a plurality of multibit Operation fields;

instruction storage means comprised of a number of bit stages;

instruction address means for storing address information uniquely identifying one of said storage locations for entering at least a portion of the instruction word stored therein into said instruction storage means;

a plurality of multibit data registers each having bit output lines and bit input lines;

a plurality of selectable sets of operation decoder circuits;

an OP CODE decoding means responsive to the bit content of particular stages of said instruction storage means storing said OP CODE field for selecting a particular operation decoder circuit set identified thereby;

a plurality of normally open gating circuits arranged in groups, each group being coupled to one of said operation decoder circuits, each gating circuit having bit output lines and bit input lines with the gating circuit bit output lines of the same group being connected in common to the bit input lines of one of said data registers; said gating circuit bit input lines of the same group being connected to bit output lines of different data registers;

each of said operation decoder circuits within said selected decoder circuit set being responsive to the bit content of particular stages of said instruction storage means storing one of said Operation fields for enabling a gating circuit of the group associated therewith and identified by the bit content of said Operation field.

6. The data processing system of claim 5 including arithmetic circuit means having bit output lines and first and second sets of bit input lines; and wherein said plurality of gating circuits includes at least one group of gating circuits each coupling the bit output lines of one of said data registers to a set of bit input lines of said arithmetic circuit means whereby both arithmetic and transfer operations can be executed in parallel in response to different operation fields of an instruction word.

7. The data processing system of claim 5 including a data pad memory having a plurality of storage locations each capable of storing a data word, said data pad including data input and data output lines;

pad address means for storing address information uniquely identifying one of said pad storage locations; and means responsive to said instruction word stored in said instruction storage means for accessing said identified data pad storage location to produce the data word stored therein on said data output lines or to write therein a data word applied to said data input lines.

8. The data processing system of claim 7 wherein said plurality of gating circuits includes gating circuits having bit input lines coupled to said data pad output lines and gating circuits having bit output lines coupled to said data pad input lines.

9. The data processing system of claim 7 wherein said instruction memory and said data memory are relatively small, fast access memories; and including a large external memory having a plurality of locations and including memory input and output lines; and wherein said plurality of gating circuits includes gating circuits having bit input lines coupled to said large memory output lines.

10. The data processing system of claim 9 wherein said large memory includes address means for uniquely identifiying one of said large memory locations;

means coupling the bit output lines of one of said data registers to said large memory input lines; and means responsive to said instruction word stored in said instruction means for accessing said identified large memory location to read data therefrom onto said output lines or to write data therein from said input lines.

* * * * *